US012754287B2

(12) United States Patent
Nguyen et al.

(10) Patent No.: US 12,754,287 B2
(45) Date of Patent: Oct. 6, 2026

(54) MULTI-USER HAND GESTURE RECOGNITION

(71) Applicant: Samsung Electronics Co., Ltd., Suwon-si (KR)

(72) Inventors: Viet Nguyen, Frisco, TX (US); Yuming Zhu, Plano, TX (US); Qiang Xie, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

(21) Appl. No.: 18/759,301

(22) Filed: Jun. 28, 2024

(65) Prior Publication Data

US 2025/0044411 A1 Feb. 6, 2025

Related U.S. Application Data

(60) Provisional application No. 63/530,347, filed on Aug. 2, 2023.

(51) Int. Cl.

| | |
|---|---|
| ***G01S 7/41*** | (2006.01) |
| ***G01S 13/10*** | (2006.01) |
| ***G06F 3/01*** | (2006.01) |

(52) U.S. Cl.

CPC ............. *G01S 7/415* (2013.01); *G01S 13/103* (2013.01); *G06F 3/017* (2013.01)

(58) Field of Classification Search

CPC ........ G01S 13/103; G01S 13/62; G01S 13/88; G01S 7/006; G01S 7/415; G06F 3/017

See application file for complete search history.

(56) References Cited

U.S. PATENT DOCUMENTS

| | | | | |
|---|---|---|---|---|
| 10,691,219 | B2 * | 6/2020 | Holz | G06F 3/0304 |
| 11,550,048 | B2 | 1/2023 | Hayashi et al. | |
| 11,797,098 | B2 | 10/2023 | Liu et al. | |
| 11,953,619 | B2 | 4/2024 | Avila et al. | |
| 2015/0124084 | A1 * | 5/2015 | Ikenoue | A63F 13/213 348/135 |
| 2016/0246370 | A1 * | 8/2016 | Osman | A63F 13/211 |
| 2020/0097065 | A1 * | 3/2020 | Iyer | G06F 3/017 |
| 2021/0132699 | A1 * | 5/2021 | Park | G06F 18/241 |
| 2021/0294427 | A1 * | 9/2021 | Zhou | G06F 3/017 |
| 2022/0326367 | A1 * | 10/2022 | Matuszak | G06N 3/0442 |

(Continued)

FOREIGN PATENT DOCUMENTS

| | | | |
|---|---|---|---|
| CN | 115840504 | A | 3/2023 |
| WO | 2022/251825 | A1 | 12/2022 |

*Primary Examiner* — Peter M Bythrow

(57) ABSTRACT

An embodiment includes a method of multi-user gesture recognition includes determining positions of a plurality of users based on a first radar information from at least one radar, determining a plurality of regions of interest for the plurality of users based on positions of the plurality of users, in a first duty cycle of a plurality of duty cycles, obtaining a second radar information using a first radar configuration that includes a first set of parameters for gesture recognition at a range of distances based on the plurality of regions of interest, in a second duty cycle, obtaining a third radar information using a second radar configuration, and detecting a first user gesture from a first user of the plurality of users and a second user gesture from a second user of the plurality of users based on the second and third radar information.

20 Claims, 18 Drawing Sheets

(56) References Cited

U.S. PATENT DOCUMENTS

| | | | | |
|---|---|---|---|---|
| 2023/0161027 | A1* | 5/2023 | Amihood ................ | G01S 7/023 342/109 |
| 2024/0096033 | A1* | 3/2024 | McCracken ............ | G06F 3/167 |

* cited by examiner (a) Coarser angle resolution (b) Finer angle resolution

MULTI-USER HAND GESTURE RECOGNITION

CROSS-REFERENCE TO RELATED APPLICATIONS

This application claims the benefit of priority from U.S. Provisional Application No. 63/530,347, entitled "Multi-User Hand Gesture Recognition using UWB Radar for Smart Home Devices" filed Aug. 2, 2023, U.S., which is incorporated herein by reference in its entirety.

TECHNICAL FIELD

This disclosure relates generally to a wireless communication system, and more particularly to, for example, but not limited to, multi-user hand gesture recognition using ultra-wideband (UWB) radar for smart home device.

BACKGROUND

In the home settings, hand gesture recognition has been a very useful feature for smart home devices, which may include any of a variety of devices including home charger hubs, TVs, refrigerators, washing machines, among other devices. Hand gesture recognition can provide an intuitive and convenient user interface to these devices. For example, while a user watches TV while sitting on a sofa, the user can perform different gestures to navigate through programs on the TV including, for example, swiping their hand to move to the next program, or tapping on the air towards the TV to stop the current program. These hand gesture recognition features may be detected by one or more sensors that may include cameras together with computer vision techniques. However, using camera based technologies may have the disadvantage of raising certain privacy concerns from the user. Other techniques for gesture recognition may include using Ultra-Wideband (UWB) radar technology. UWB technology has been gradually integrated in mobile and consumer products for a variety of applications, including device to device localization and indoor localization. The next generation of UWB chips may also be equipped with radar capabilities where a device can detect motion as well as the location of the motion within its Field-of-view (FOV).

The description set forth in the background section should not be assumed to be prior art merely because it is set forth in the background section. The background section may describe aspects or embodiments of the present disclosure.

SUMMARY

One aspect of the present disclosure provides a method of multi-user gesture recognition. The method comprises determining positions of a plurality of users based on a first radar information from at least one radar. The method comprises determining a plurality of regions of interest for the plurality of users based on positions of the plurality of users. The method comprises in a first duty cycle of a plurality of duty cycles, obtaining a second radar information using a first radar configuration that includes a first set of parameters for gesture recognition at a range of distances based on the plurality of regions of interest. The method comprises in a second duty cycle of the plurality of duty cycles, obtaining a third radar information using a second radar configuration that includes a first radar mode for a first time period and a second radar mode for a second time period based on the plurality of regions of interest, wherein the first radar mode includes the first set of parameters for gesture recognition at the range of distances and the second radar mode includes a second set of parameters for gesture recognition within a closer range of distances. The method comprises detecting a first user gesture from a first user of the plurality of users and a second user gesture from a second user of the plurality of users based on the second radar information and the third radar information.

In some embodiments, the method further comprises refining, for each of the plurality of users, a region of interest from the plurality of regions of interest to a user's hand position based on distance and angle range adjustments from the second radar information and the third radar information.

In some embodiments, the method further comprises analyzing a few range bins closer to the radar than a user body centroid to determine hand movements.

In some embodiments, the method further comprises adjusting an angle range by a margin estimated by a maximum a tangential distance of moving the user's hand and a current distance between the user and the radar.

In some embodiments, the method further comprises in a third duty cycle of the plurality of duty cycles, determining that a gesture is not allowed and waiting until a next duty cycle.

In some embodiments, the method further comprises using a third radar configuration for a third time period, wherein the third radar configuration includes a third set of parameters for gesture recognition at a far distance.

In some embodiments, the method further comprises saving a last known position of a user.

In some embodiments, the first time period is less than the second time period.

In some embodiments, the second radar configuration is continued beyond the end of the duty cycle.

In some embodiments, the first set of parameters specifies a first pulse repetition rate (PRF) and the second set of parameters specifies a second PRF, wherein the first PRF is lower than the second PRF.

One aspect of the present disclosure provides a device in a wireless network. The device comprises a memory and a processor coupled to the memory. The processor is configured to determine positions of a plurality of users based on a first radar information from at least one radar. The processor is configured to determine a plurality of regions of interest for the plurality of users based on positions of the plurality of users. The processor is configured to, in a first duty cycle of a plurality of duty cycles, obtain a second radar information using a first radar configuration that includes a first set of parameters for gesture recognition at a range of distances based on the plurality of regions of interest. The processor is configured to, in a second duty cycle of the plurality of duty cycles, obtain a third radar information using a second radar configuration that includes a first radar mode for a first time period and a second radar mode for a second time period based on the plurality of regions of interest, wherein the first radar mode includes the first set of parameters for gesture recognition at the range of distances and the second radar mode includes a second set of parameters for gesture recognition within a closer range of distances. The processor is configured to detect a first user gesture from a first user of the plurality of users and a second user gesture from a second user of the plurality of users based on the second radar information and the third radar information.

In some embodiments, the processor is further configured to refine, for each of the plurality of users, a region of interest from the plurality of regions of interest to a user's hand position based on distance and angle range adjustments from the second radar information and the third radar information.

In some embodiments, the processor is further configured to analyze a few range bins closer to the radar than a user body centroid to determine hand movements.

In some embodiments, the processor is further configured to adjust an angle range by a margin estimated by a maximum of a tangential distance of moving the user's hand and a current distance between the user and the radar.

In some embodiments, the processor is further configured to, in a third duty cycle of the plurality of duty cycles, determine that a gesture is not allowed and waiting until a next duty cycle.

In some embodiments, the processor is further configured to use a third radar configuration for a third time period, wherein the third radar configuration includes a third set of parameters for gesture recognition at a far distance.

In some embodiments, the processor is further configured to save a last known position of a user.

In some embodiments, the first time period is less than the second time period.

In some embodiments, the second radar configuration is continued beyond the end of the duty cycle.

In some embodiments, the first set of parameters specifies a first pulse repetition rate (PRF) and the second set of parameters specifies a second PRF, wherein the first PRF is lower than the second PRF.

Figure 1:
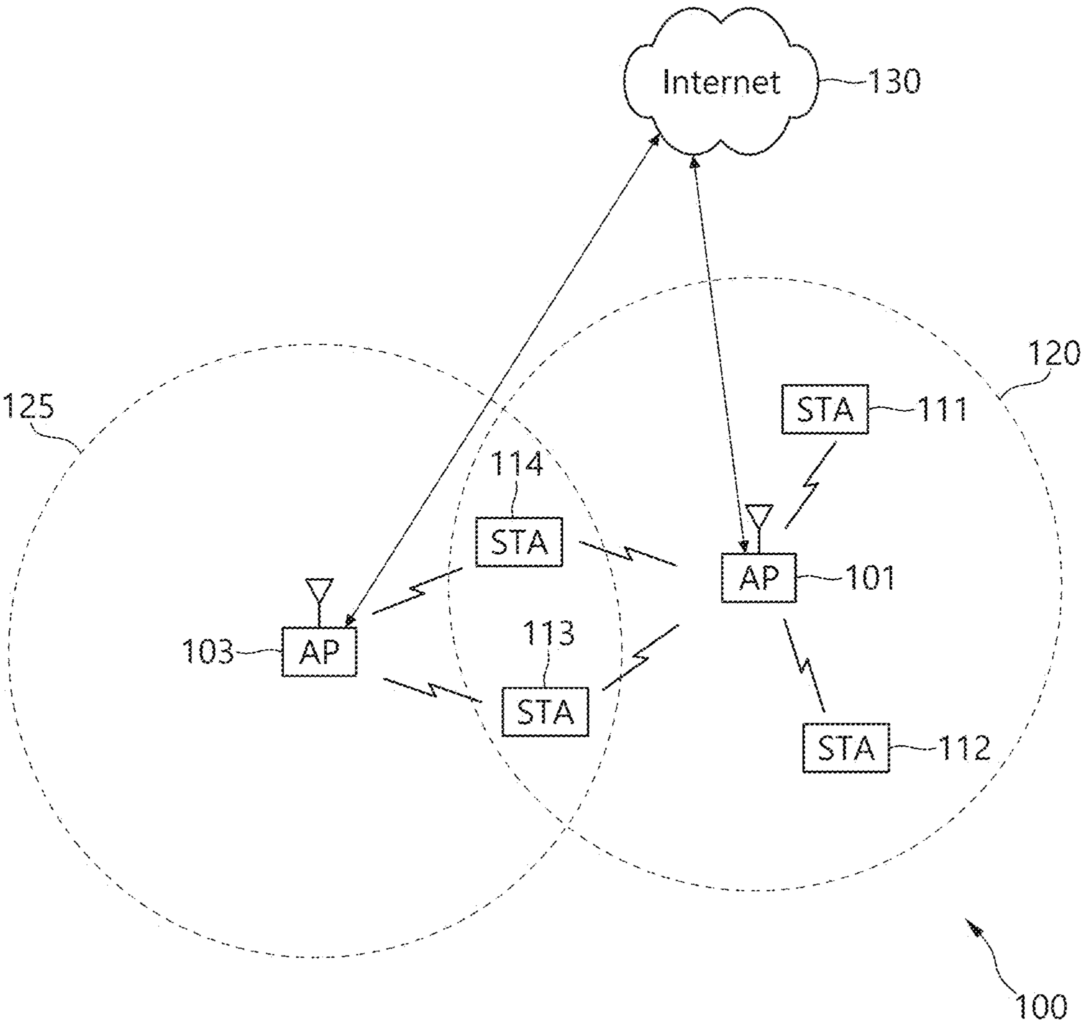
FIG. 1 illustrates an example of a wireless network in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The following description is directed to certain implementations for the purpose of describing the innovative aspects of this disclosure. However, a person having ordinary skill in the art will readily recognize that the teachings herein can be applied in a multitude of different ways. The described embodiments may be implemented in any device, system or network that is capable of transmitting and receiving radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

Wireless local area network (WLAN) technology has evolved toward increasing data rates and continues its growth in various markets such as home, enterprise and hotspots over the years since the late 1990s. WLAN allows devices to access the internet in the 2.4 GHz, 5 GHz, 6 GHz or 60 GHz frequency bands. WLANs are based on the Institute of Electrical and Electronic Engineers (IEEE) 802.11 standards. IEEE 802.11 family of standards aims to increase speed and reliability and to extend the operating range of wireless networks.

WLAN devices are increasingly required to support a variety of delay-sensitive applications or real-time applications such as augmented reality (AR), robotics, artificial intelligence (AI), cloud computing, and unmanned vehicles.

To implement extremely low latency and extremely high throughput required by such applications, multi-link operation (MLO) has been suggested for the WLAN. The WLAN is formed within a limited area such as a home, school, apartment, or office building by WLAN devices. Each WLAN device may have one or more stations (STAs) such as the access point (AP) STA and the non-access-point (non-AP) STA.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

FIG. 1 shows an example of a wireless network 100 in accordance with an embodiment. The embodiment of the wireless network 100 shown in FIG. 1 is for illustrative purposes only. Other embodiments of the wireless network 100 could be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 communicate with at least one network 130, such as the Internet, a proprietary Internet Protocol (IP) network, or other data network. The AP 101 provides wireless access to the network 130 for a plurality of stations (STAs) 111-114 with a coverage are 120 of the AP 101. The APs 101 and 103 may communicate with each other and with the STAs using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs. Although FIG. 1 shows one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provides STAs with direct wireless broadband access to the network 130. Further, the APs 101 and/or 103 could provide access to other or additional external networks, such as external telephone networks or other types of data networks.

Figure 2:
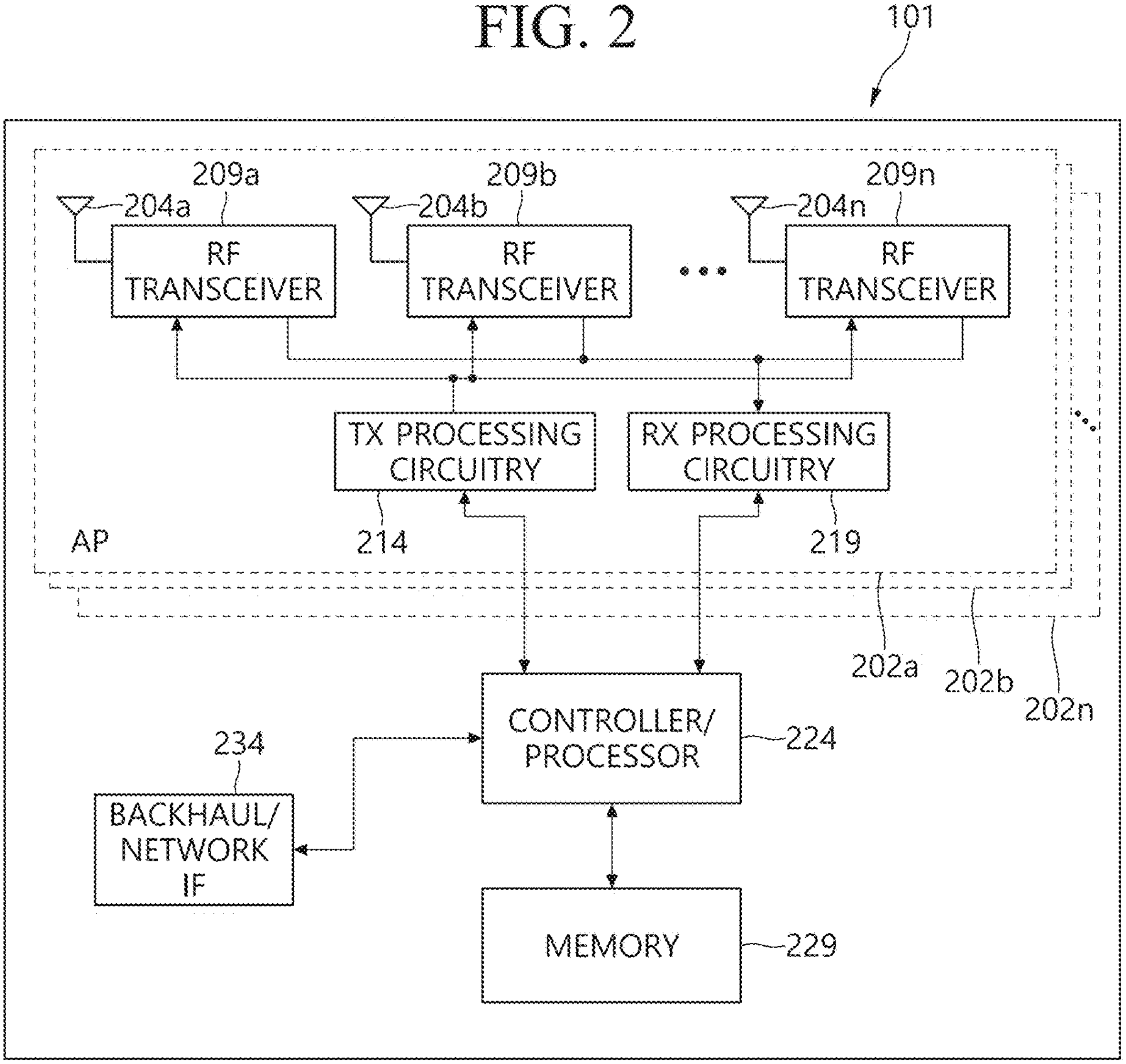
FIG. 2 illustrates an example of an access point (AP) in accordance with an embodiment.

FIG. 2 shows an example of AP 101 in accordance with an embodiment. The embodiment of the AP 101 shown in FIG. 2 is for illustrative purposes, and the AP 103 of FIG. 1 could have the same or similar configuration. However, APs come in a wide range of configurations, and FIG. 2 does not limit the scope of this disclosure to any particular implementation of an AP.

As shown in FIG. 2, the AP 101 may include multiple antennas 204*a*-204*n*, multiple radio frequency (RF) transceivers 209*a*-209*n*, transmit (TX) processing circuitry 214, and receive (RX) processing circuitry 219. The AP 101 also may include a controller/processor 224, a memory 229, and a backhaul or network interface 234. The RF transceivers 209*a*-209*n* receive, from the antennas 204*a*-204*n*, incoming RF signals, such as signals transmitted by STAs in the network 100. The RF transceivers 209*a*-209*n* down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of uplink signals and the transmission of downlink signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for management of channel sounding procedures in WLANs. Although FIG. 2 illustrates one example of AP 101, various changes may be made to FIG. 2. For example, the AP 101 could include any number of each component shown in FIG. 2. As a particular example, an AP could include a number of interfaces 234, and the controller/processor 224 could support routing functions to route data between different network addresses. As another example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2 could be combined, further subdivided, or omitted and additional components could be added according to particular needs.

As shown in FIG. 2, in some embodiment, the AP 101 may be an AP MLD that includes multiple APs 202*a*-202*n*. Each AP 202*a*-202*n* is affiliated with the AP MLD 101 and includes multiple antennas 204*a*-204*n*, multiple radio frequency (RF) transceivers 209*a*-209*n*, transmit (TX) processing circuitry 214, and receive (RX) processing circuitry 219. Each APs 202*a*-202*n* may independently communicate with the controller/processor 224 and other components of the AP MLD 101. FIG. 2 shows that each AP 202*a*-202*n* has separate multiple antennas, but each AP 202*a*-202*n* can share multiple antennas 204*a*-204*n* without needing separate multiple antennas. Each AP 202*a*-202*n* may represent a physical (PHY) layer and a lower media access control (MAC) layer.

Figure 3:
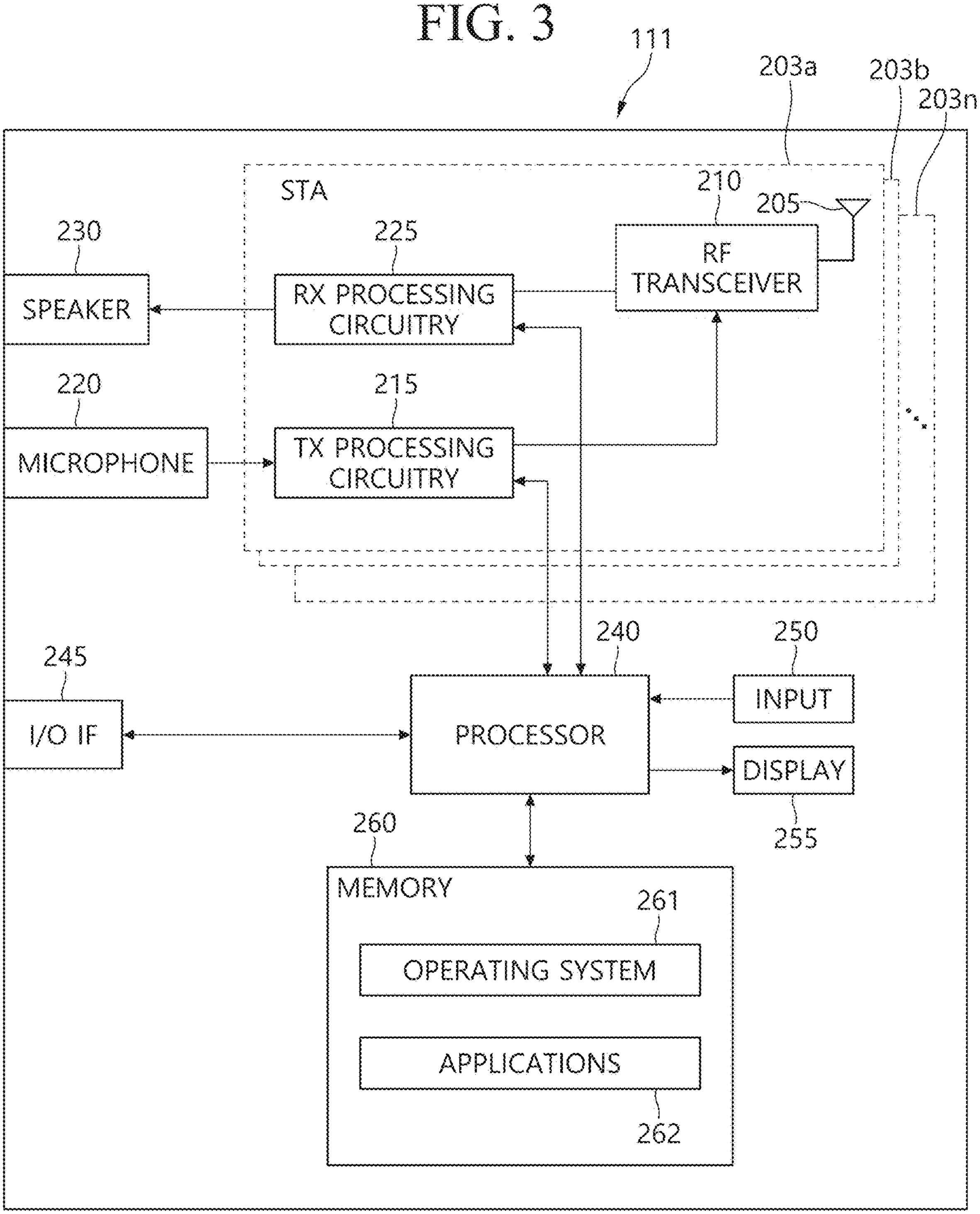
FIG. 3 illustrates an example of a station (STA) in accordance with an embodiment.

FIG. 3 shows an example of STA 111 in accordance with an embodiment. The embodiment of the STA 111 shown in FIG. 3 is for illustrative purposes, and the STAs 111-114 of FIG. 1 could have the same or similar configuration. However, STAs come in a wide variety of configurations, and FIG. 3 does not limit the scope of this disclosure to any particular implementation of a STA.

As shown in FIG. 3, the STA 111 may include antenna(s) 205, a RF transceiver 210, TX processing circuitry 215, a microphone 220, and RX processing circuitry 225. The STA 111 also may include a speaker 230, a controller/processor 240, an input/output (I/O) interface (IF) 245, a touchscreen 250, a display 255, and a memory 260. The memory 260 may include an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an IF or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the controller/processor 240 controls the reception of downlink signals and the transmission of uplink signals by the RF transceiver 210, the RX processing circuitry 225, and the TX processing circuitry 215 in accordance with well-known principles. The controller/processor 240 can also include processing circuitry configured to provide management of channel sounding procedures in WLANs. In some embodiments, the controller/processor 240 may include at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet announcement (NDPA) and null data packet (NDP) and transmitting the beamforming feedback report in response to a trigger frame (TF). The controller/processor 240 can operate the plurality of applications 262 based on the OS program 261 or in response to a signal received from an AP. The controller/processor 240 is also coupled to the I/O interface 245, which provides STA 111 with the ability to connect to other devices such as laptop computers and handheld computers. The I/O interface 245 is the communication path between these accessories and the main controller/processor 240.

The controller/processor 240 is also coupled to the input 250 (such as touchscreen) and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 3 shows one example of STA 111, various changes may be made to FIG. 3. For example, various components in FIG. 3 could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 3 illustrates the STA 111 configured as a mobile telephone or smartphone, STAs could be configured to operate as other types of mobile or stationary devices.

As shown in FIG. 2B, in some embodiment, the STA 111 may be a non-AP MLD that includes multiple STAs 203*a*-203*n*. Each STA 203*a*-203*n* is affiliated with the non-AP MLD 111 and includes an antenna(s) 205, a RF transceiver 210, TX processing circuitry 215, and RX processing circuitry 225. Each STAs 203*a*-203*n* may independently communicate with the controller/processor 240 and other components of the non-AP MLD 111. FIG. 3 shows that each STA 203*a*-203*n* has a separate antenna, but each STA 203*a*-203*n* can share the antenna 205 without needing separate antennas. Each STA 203*a*-203*n* may represent a physical (PHY) layer and a lower media access control (MAC) layer.

Prior techniques that use UWB radar for hand gesture recognition may be limited to recognizing hand gestures from a single user that is closest to the radar, and the working range may be limited (e.g. under 1-2 m). For practical usages in the home environment, many embodiments in accordance with this disclosure can provide gesture recognition of multiple people positioned at different locations and who can be located as far as up to, for example, 4 m or more from the device. Accordingly, this disclosure presents techniques that may utilize a UWB chip's radar capability to support hand gesture recognition from multiple users within the coverage area of the UWB radar.

In some embodiments, a UWB module, including a UWB chip and associated antennas, is embedded inside a device. The UWB module may be able to detect motions and the positions of the motions inside a coverage area which may be defined by its maximum detectable range and Field of View (FOV). Some embodiments may be able to recognize the hand gestures performed by each of the users inside the coverage range of the radar. However, there may be several challenges in order to achieve the hand gesture recognition, several of which are described below.

In a typical home setting, there can be multiple people positioned at different locations in a room with a radar. As such, a hand gesture may come from one or more different persons at any given time and thus the radar should be able to recognize the gestures from different people in real time.

Gesture recognition at different distances may present certain issues. In particular, there are several issues when hand gestures are expected to be detected at a longer range (e.g. up to 4 m). More false alarms can arise as the range to be scanned becomes larger. Motions can come from not only human activities (e.g. walking, sitting, exercising, among others) but also from home appliances (e.g. fan, cleaning robots, among others) and pets (e.g. dogs, cats). Another issue may be some input features related to angle-of-arrival of the target for the hand gesture classifier can become noisy due to insufficient angle resolution. For example, at a close distance, a swipe left gesture can create an angle change in the Time Angle Diagram (TAD) from −25 deg to 25 deg, so a 5 deg angle resolution would be sufficient to observe this change. In contrast, at a far distance (e.g. 3 m), the same swipe left gesture may only create an angle change from −9 deg to 9 deg, and the 5 deg angle resolution would not be able to see this change.

Yet another challenge may include how to schedule different radar modes that may be appropriate for different users at different distances from the radar. Since a single radar mode may not be able to satisfy a variety of sensing tasks, multiple radar modes should be scheduled in a way that provides responsive hand gesture recognition ability.

Accordingly, some embodiments may utilize the location tracking of the multiple subjects in the coverage area of the UWB radar and determine the proper radar modes and radar settings (e.g., range, angle to focus, among others) to be able to recognize gestures from multiple users in real time. In some embodiments, multi-user gesture recognition algorithms may be utilized that may include the techniques described herein to address the described challenges associated with multi-user recognition.

In some embodiments, by utilizing a common radar mode for multi-target human position tracking, the positions of the users in the room can be tracked. From this information, the radar can determine the regions of interest for the hand movements for different users, which may provide more targeted hand gesture recognition.

Some embodiments may reduce the false alarms caused by other motions in the room by proper range bin selection which may be based on the results of human location tracking. To improve the quality of the classifier's input features related to the angle-of-arrival, some embodiments may set the proper angle range and resolution based on the human subject positions (including range and angle of the human body centroid with respect to the radar).

Some embodiments may use a dedicated radar mode scheduler that relies on human subject positions and whether hand gestures are allowed at a current time step to determine appropriate radar modes to be added to the scheduling in each duty cycle.

UWB Radar

In some embodiments, in an impulse response (IR)-UWB Radar system, UWB pulses may be transmitted from a transmitter (TX) antenna, scattered by objects and the environment, and received on a receiver (RX) antenna. The received signal strength is typically dependent on the target object's distance to the antennas and its relative size.

The channel impulse response (CIR) may be estimated in the UWB radar firmware of the module. The raw CIR is denoted by h[n, m] (m=1, 2, . . . , $N_r$) for the $n^{th}$ slow time index and $m^{th}$ range bin on the RX antenna, where $N_r$ is the number of range bins.

Figure 4:
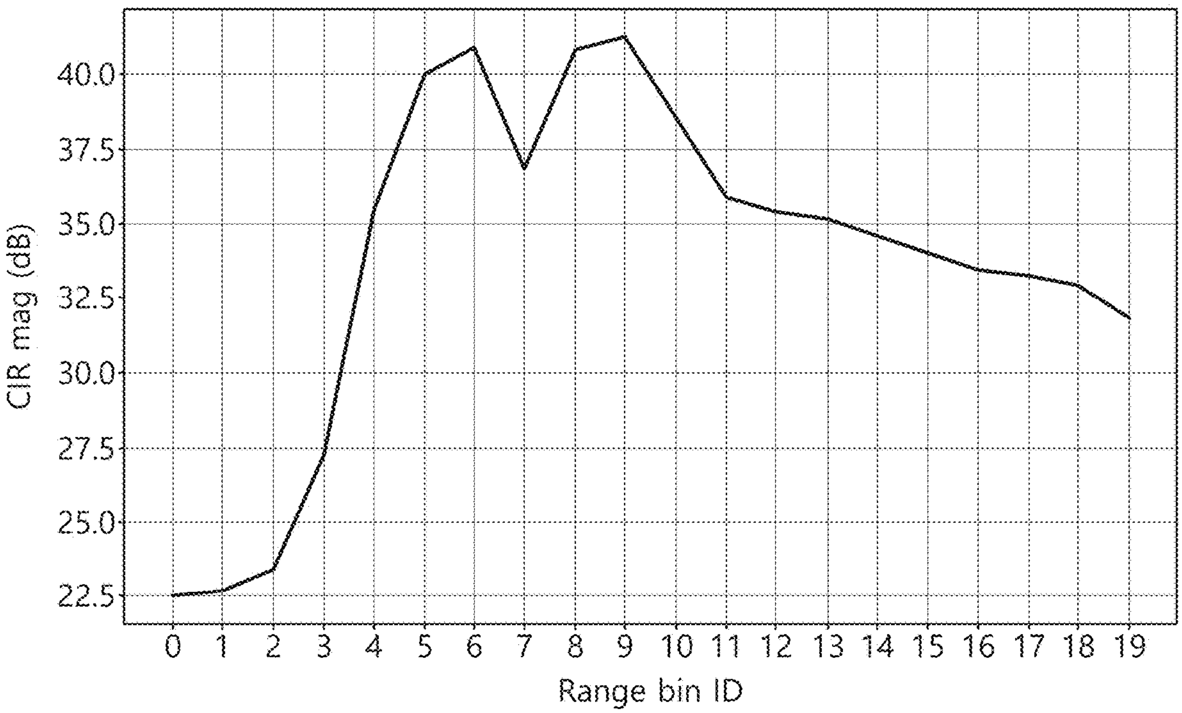
FIG. 4 shows an example of channel impulse response (CIR) at one slow time index in accordance with an embodiment.

FIG. 4 shows an example of CIR at one slow time index in accordance with an embodiment. In particular, FIG. 4 shows the CIR magnitude at each range bin ID. The x-axis provides the Range bin ID and the y-axis provides the CIR magnitude.

2D Tracking

In some embodiments, with one antenna, the UWB module can determine the range from the radar to the moving target, but not the angle-of-arrival of this target. To determine such angle-of-arrival, the UWB module may require two or more antennas being placed next to each other in the same plane as the moving area. In a typical setup, in which most movements are in the same room floor (horizontal plane), the antennas may also be placed in the same horizontal plane. The angle-of-arrival of the target movements can be determined by comparing the phases of the receiving signal of the two antennas. In some embodiments, the system can be extended to track movements in 3D space, including both when the user moves within the same room floor and when the user ascends/descends a stair, by utilizing one or multiple antennas in the vertical dimension. The capability to determine both range and angle-of-arrival of moving targets may be important in a multi-user gesture recognition solution.

Some embodiments may keep track of a last known 2D position of a human target. With the last movement of the target user being known, the gesture recognition module can be more focused on the area surrounding this last movement position. In some embodiments, in a gesture recognition module, the range and angle-of-arrival can be recalculated at a finer resolution to produce Time-Velocity Diagram (TVD) and a Time-Angle Diagram (TAD) to be used in a gesture classifier.

Radar Operation Modes

Some embodiments may include a device with a UWB radar module and multiple antennas. In some embodiments, there may be different radar operation modes to adapt to different sensing purposes. Each radar operation mode may be a collection of different radar parameters, such as Pulse Repetition Rate (PRF), number of pulses in a burst, among others. In some embodiments, two targets may be defined for radar sensing: human body movements and hand gesture movements. For human body movements, due to the large reflection area of the human body (including torso, arms and legs), it may create significant received energy at the receiving antennas. The speed of this type of movements may also be lower (especially considering the types of indoor movements of human subjects), thus may require lower PRF. In contrast, for hand gesture movements, the reflection area is only the smaller hand palm area, so the received energy at the receiving antennas is significantly lower, especially at far distances. Also, due to the gesture's fast speed, the PRF required for hand gesture recognition may be higher in order to obtain distinctive features from the gestures to be classified.

In some embodiments, depending on the hardware configurations, there can be multiple radar configurations with respect to serving the radar sensing tasks. Described below are several radar configurations and the associated set of radar operation modes required in each radar configuration in accordance with an embodiment.

In some embodiments, in a baseline radar configuration, which may be referred to as radar configuration 1, only one radar operation mode with the highest PRF, may be used to cover all ranges and for all applications.

In another radar configuration, which may be referred to as radar configuration 2, for power reduction purpose, two radar operation modes may be in use. A Radar Mode 2A, characterized with lower PRF, may be used for human body movement tracking purpose at all distances within the radar's coverage range all the time. A Radar Mode 2B, characterized by higher PRF, may be used for human gesture movement recognition when several conditions are satisfied.

In yet another radar configuration, which may be referred to as radar configuration 3, with different radar modes, including Radar Mode 3A, Radar Mode 3B, and Radar Mode 3C, may be used for the two radar sensing tasks similar to radar configuration 2. However, due to limited RX dynamic range, when setting too high TX power and/or RX gain to be able to sense small movements at far distance, the CIR values at range bins corresponding to close distance would be saturated. For this radar configuration, the following radar operation modes may be used.

In some embodiments, Radar Mode 3A may be used for human body movement tracking in the whole radar's coverage range (e.g. 4 m). Some common radar parameters used in this mode may include: lower PRF, moderate RX gain, lower TX power. CIR at range bins corresponding to the close distance may not be saturated and human body movements at close distance are observable. As a result, small hand movements at far distance would produce very low reflection energy at the receiving antennas and thus difficult to detect.

In some embodiments, the Radar Mode 3B may be used for gesture recognition for hand gestures performed at close distance (e.g. <2 m). Some common radar parameters used in this mode may include: higher PRF, moderate RX gain, lower TX power. CIR at range bins corresponding to the close distance may not be saturated and hand movements at close distance are observable. In the Radar Mode 3B, small hand movements at far distances would produce very low reflection energy at the receiving antennas, and thus be difficult to be detected.

In some embodiments, the Radar Mode 3C may be used for gesture recognition for hand gestures performed at far distance (e.g. 2-4 m). Some common radar parameters used in this mode may include: higher PRF, higher RX gain, higher TX power. Reflection energy from hand gestures at far distance would become observable at the radar. The downside is that the CIR values at range bins corresponding to close distance (e.g. <2 meters) would be saturated and unable to detect any movements within that range.

Figure 5:
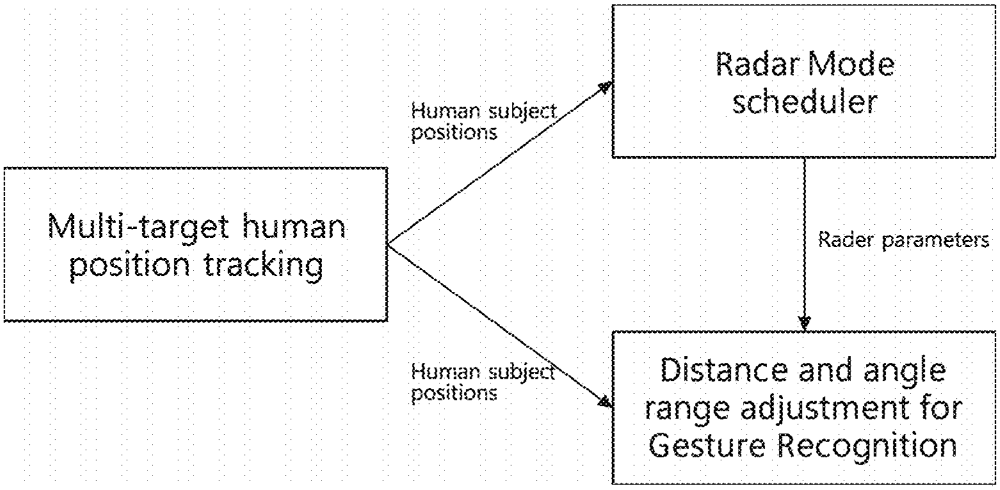
FIG. 5 illustrates an architecture of several modules in a multi-user gesture recognition process in accordance with an embodiment.

FIG. 5 illustrates an architecture of several modules in a multi-user gesture recognition process in accordance with an embodiment. The modules may include a multi-target human position tracking module, a radar mode scheduler module, and a distance and angle range adjustment for gesture recognition module. As shown in FIG. 5, first, a multi-target human position tracking module may provide the positions of one or more human subjects within the coverage of the radar. In each duty cycle, based on the current human subject positions, their estimated status (e.g. moving around vs. roughly staying in one place), as well as application context, a radar mode scheduler module may add different radar sessions with appropriate radar parameters for recognizing hand gestures and/or human body movements from individual subjects. Note that the radar mode scheduler module may only be applied for the radar configurations that require two or more radar modes (e.g., Radar Configuration 2 and 3 described above). For each human subject, based on the known subject position, a distance and angle range adjustment for gesture recognition module helps focus the region of interest to the subject's hand position and/or body location and improve the quality of the input features (e.g., Time Angle Diagram) to the gesture classifier.

Multi-Target Human Position Tracking

In some embodiments, the positions of individual humans in the area in front of the device with UWB Radar may help improve the performance of multi-user gesture recognition. Radar Mode A may be used to achieve this position tracking purpose.

In some embodiments, the multi-target position tracking module is done on a moving window basis. At each time (e.g., set by a duty cycle's period), the most recent CIR windows coming from the antennas may be formed and provided into the processing pipeline. The CIR window size can be chosen to be long enough to capture movements. For example, in a UWB radar mode with 100 Hz sampling rate, the window size can be 64 samples, making the window length 0.64 second. Note that the window size is typically chosen to be a power of 2 for faster Fourier transform implementation.

Per-Window Target Detection

Range Doppler Map (RDM) calculation

In some embodiments, the input CIR window of size $N_{FFT}$ is converted to Range-Doppler map (RDM) by applying the Fast Fourier Transform (FFT) across the slow-time index n as follows:

$$RDM[k, m] = \sum_{p=0}^{N_{FFT}-1} h[p, m] e \frac{j2\pi pk}{N_{FFT}} \text{ for } k \in \mathcal{K} = \left\{-\frac{N_{FFT}}{2}, \frac{N_{FFT}}{2} - 1, \ldots, \frac{N_{FFT}}{2} - 2, \frac{N_{FFT}}{2} - 1\right\}$$

where n is the slow time index, m is the range bin, and k is the Doppler bin.

Figure 6:
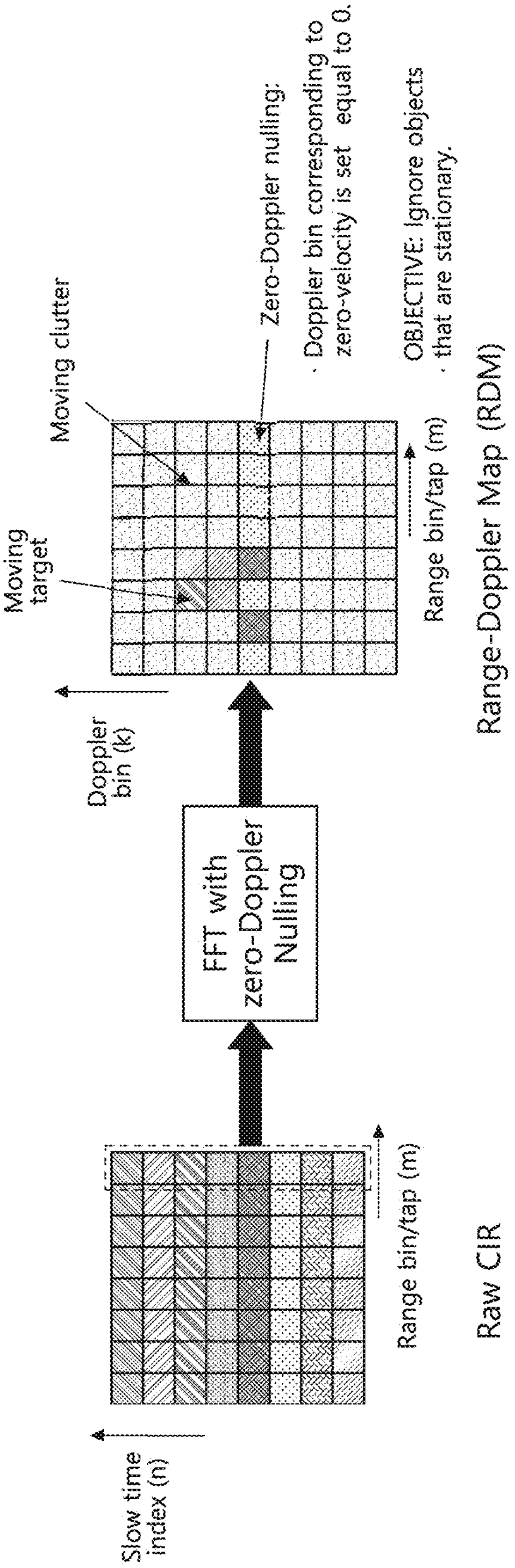
FIG. 6 shows the processing flow to compute an range depth map from an input CIR window in accordance with an embodiment.

FIG. 6 shows the processing flow to compute an RDM from an input CIR window in accordance with an embodiment. As illustrated, a FFT with zero-doppler nulling is applied to a RAW CIR to convert to an RDM. In some embodiments, the RDM is a 2D map with one dimension is the range bin, which may represent the distance from the Hub device to the target, and the other dimension is Doppler frequency, which can be translated to velocity. The zero-frequency component of the RDM may be set to 0 (zero-nulling) in order to remove the non-moving clutter components.

CA-CFAR (Cell Averaging Constant False Alarm Rate) Detection

In some embodiments, for each cell under test (CUT) in the calculated RDM, its power level is compared with a threshold to determine if it belongs to a potential target. Some embodiments may use a radar target detection technique that uses Cell Averaging Constant False Alarm Rate (CA-CFAR), in which an adaptive threshold is calculated for each cell based on the energy level of neighboring cells, which provides a constant probability of false alarm. In particular, the threshold level for a CUT may be calculated by taking a block of cells around the CUT and calculating the average power level. To avoid corrupting the estimate with power from the CUT itself, the cells that are closest to the CUT, called guard cells, may be ignored. A CUT is declared a hit if its power level is greater than the local average power. The output from the CA-CFAR detection is a hit map, a 2D map of the same size with the RDM in which its cell is a hit or a miss.

Figure 7:
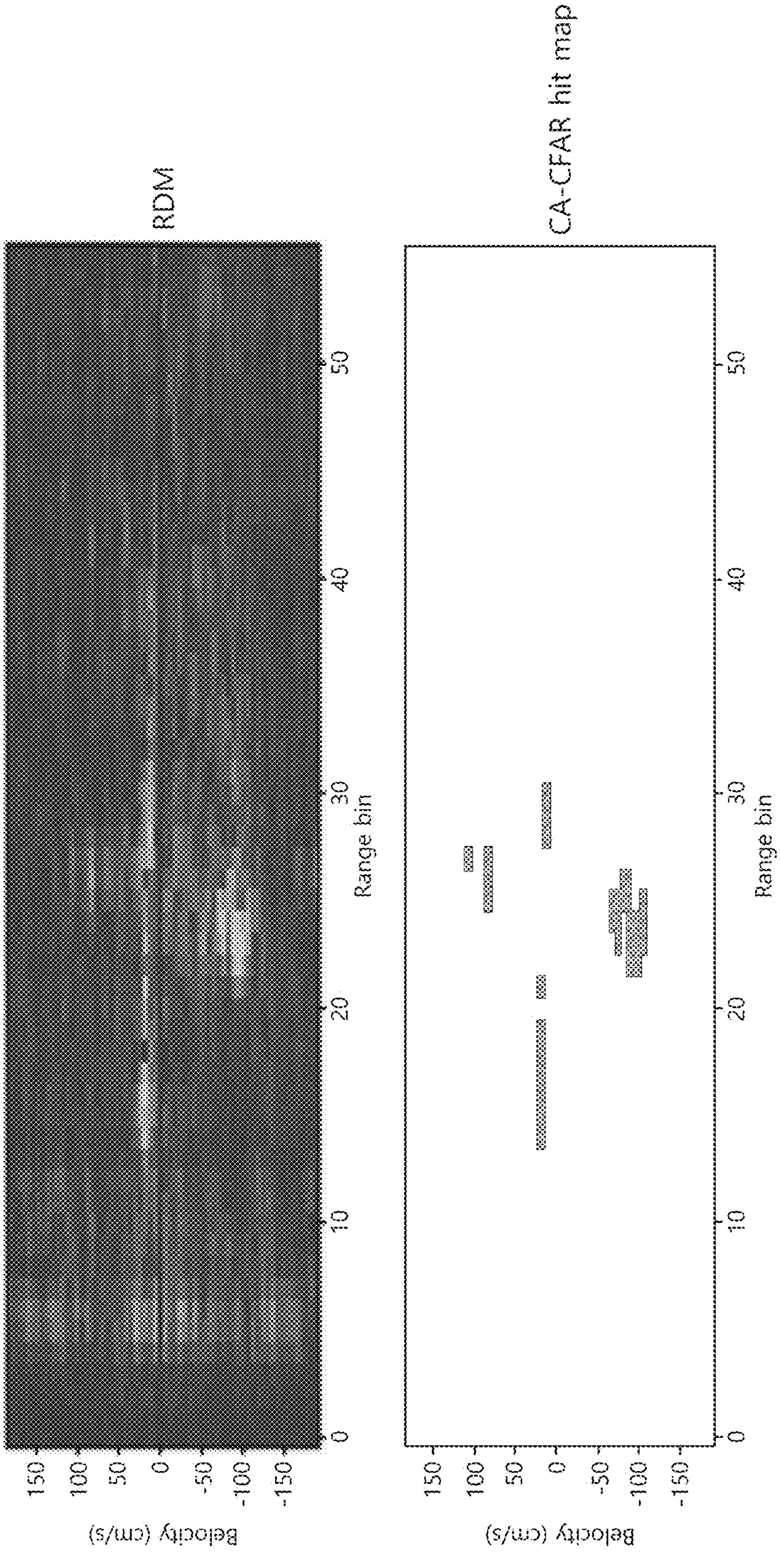
FIG. 7 illustrates a Cell Averaging Constant False Alarm Rate (CA-CFAR) process in accordance with an embodiment.

FIG. 7 illustrates a CA-CFAR process in accordance with an embodiment. In particular, FIG. 7 illustrates an RDM and a CA-CFAR hit map. As illustrated, the x-axis corresponds to the range bin and the y-axis corresponds to the velocity (cm/s).

CFAR Hit Map Filter

In some embodiments, for some moving objects, such as a moving fan, because of their fixed frequency, their signature on the CFAR hit map is a single line. In contrast, a signature from human motions tends to include adjacent frequencies, so their signature on the CFAR hit map is a group of adjacent cells, both in frequency (velocity) and range dimensions. Thus, to remove the movements from some objects, the CFAR hit map can be filtered using morphological processing as may be used in image processing. In particular, the following morphological processing operations, including erosion and dilation, may be utilized in accordance with several embodiments.

Some embodiments may apply erosion which may shrink an image by stripping away a layer of pixels from both the inner and outer boundaries of regions. The holes and gaps between different regions become larger, and small details are eliminated. Some embodiments may apply dilation which may add a layer of pixels to both the inner and outer boundaries of regions.

Figure 8:
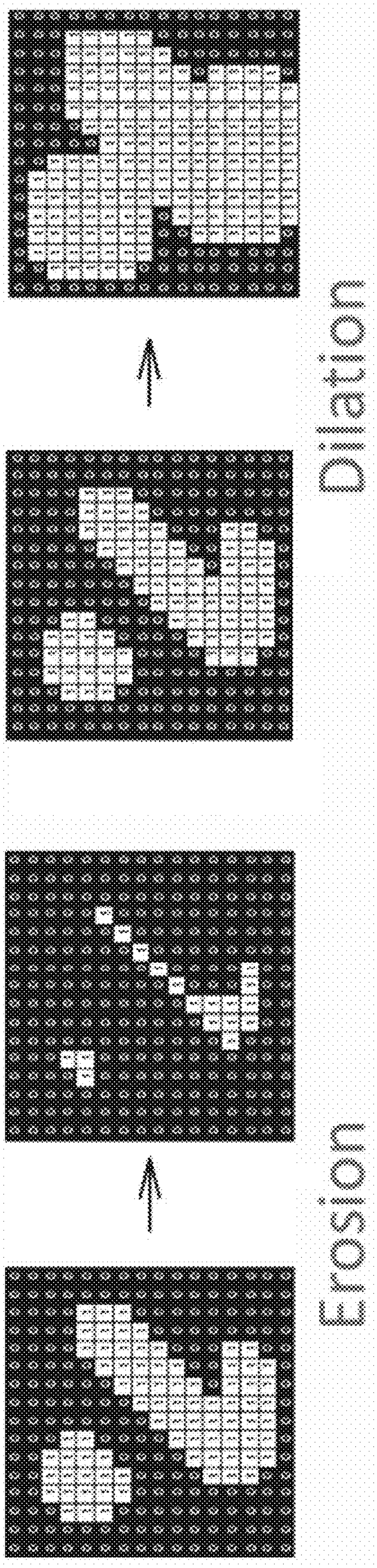
FIG. 8 illustrates filtering out the movement from other objects in accordance with an embodiment.

FIG. 8 illustrates filtering out the movement from other objects in accordance with an embodiment. As illustrated in FIG. 8, first erosion may be applied to the hit map and then dilation is performed. As a result, only cells that are related to human movement are kept.

Figure 9:
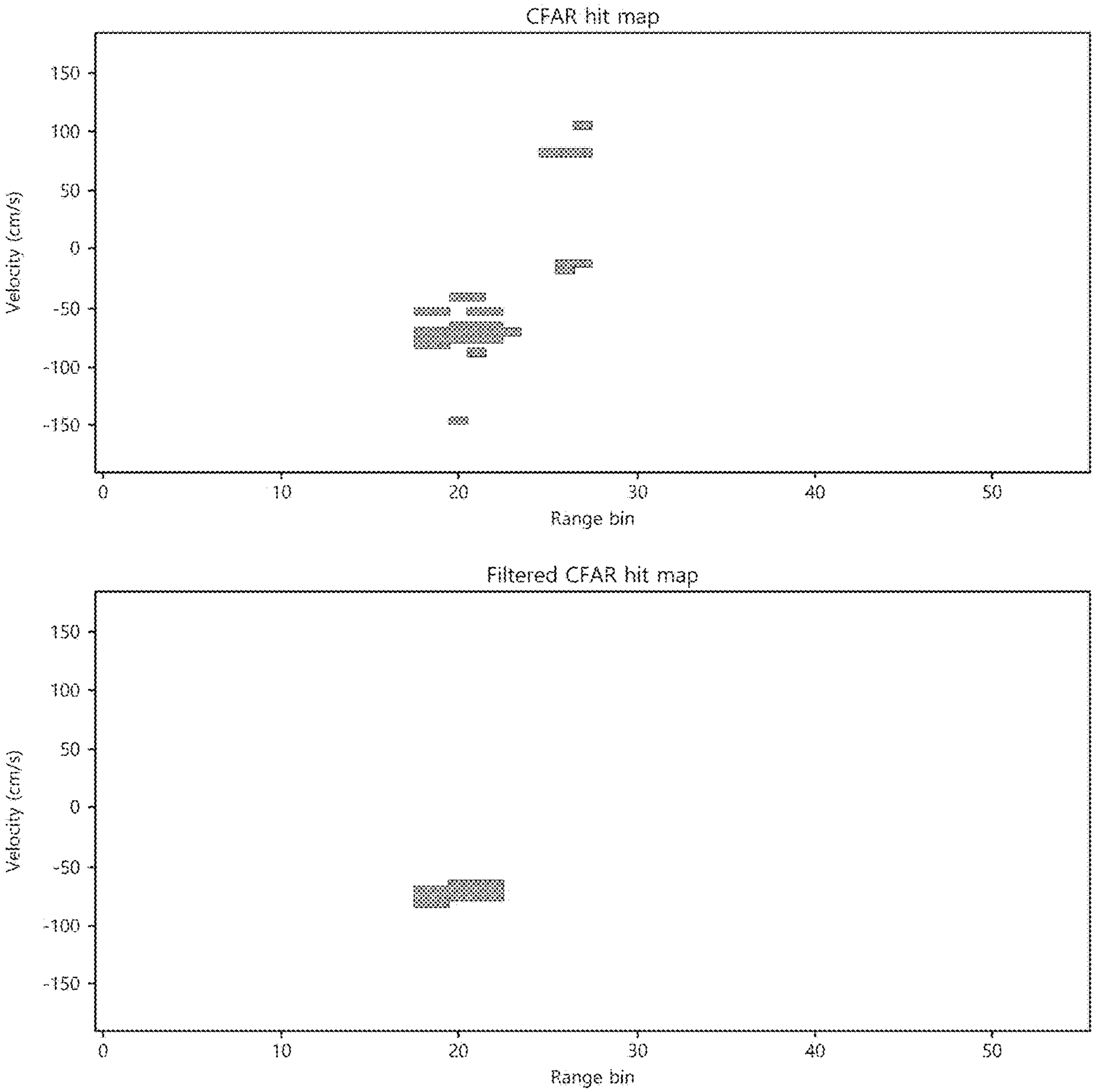
FIG. 9 illustrates a CFAR hit map filter in accordance with an embodiment.

FIG. 9 illustrates a CFAR hit map filter in accordance with an embodiment. In particular, FIG. 9 illustrates a CFAR hit map and a filtered CFAR hit map where erosion and dilation have been performed. The x-axis provides a range bin and the y-axis provides a velocity in cm/s.

Target Clustering and Localization

In some embodiments, the remaining cells may be provided into a clustering algorithm, such as DBSCAN, to group adjacent cells into one group representing one target. Each group may then be represented by its centroid, which may be a point with coordinates equal to the average of coordinates from all the cells in that group.

Human Movement Detection

In some embodiments, a next step is to determine if the movement surrounding each centroid is indeed a human motion, which may be determined based on the following steps described below.

Extract several range bins surrounding the centroid, from start_rbid to end_rbid.

Take the sum of all CIR time series from these range bins to get cir_sum.

Calculate a spectrogram from cir_sum to get spectrogram_integrated.

There may be several different approaches to determine if the current detection is from a human movement, including the spectrogram_integrated can be considered a 2D image and fed into a Convolutional Neural Network to classify human vs. non-human movements. In some embodiments, simple features can be extracted from the spectrogram_integrated and used in a rule-based classifier. The features may include Power-weighted Doppler (PWD), bandwidth, and density. For example, these features can be extracted from the spectrogram as follows.

PWD (at timestep j):

$$PWD(j) = \frac{\sum_i f(i)S(i, j)}{\sum_i S(i, j)}$$

Bandwidth (at timestep j):

$$B(j) = \frac{\sum_i (f(i) - PWD(j))^2 S(i, j)}{\sum_i S(i, j)}$$

Density (at time step j) (number of hit cells between min_freq_cell and max_freq_cell)/(total number of cells between min_freq_cell and max_freq_cell), in which min_freq_cell is the hit cell in this time step with the lowest frequency, and max_freq_cell is the hit cell in this time step with the highest frequency. In some embodiments, these feature values may then be compared with empirical thresholds to determine if a centroid is a human movement.

2D Position Estimation of the Human Movement.

In some embodiments, upon a human movement being detected at a certain range bin rb corresponding to the distance r, the CIR windows from RX1 and RX2 at range bin rb are extracted and may be used to estimate the angle of arrival θ of this movement with respect to the radar. The estimation can be done by different methods, including phase comparison, Bartlett, MVDR, MUSIC algorithms, among others. Once distance r and angle-of-arrival θ are known, the 2D coordinate of the human movement with respect to the radar's coordinate system is calculated: x=r*sin θ, y=r*cos θ. In some embodiments, one or more 2D human movement detections may be saved to be used in a next step of multiple-target tracking.

Multiple-Target Tracking

In some embodiments, the human movement detections obtained from a previous step can come from multiple human subjects moving in a room. In some embodiments, it may be desirable to process the individual human movement detections and group them into tracks, which may represent the human movement trajectories (e.g., one trajectory for each subject). This can be achieved through various multiple target tracking (MTT) systems used in radar systems.

Figure 10:
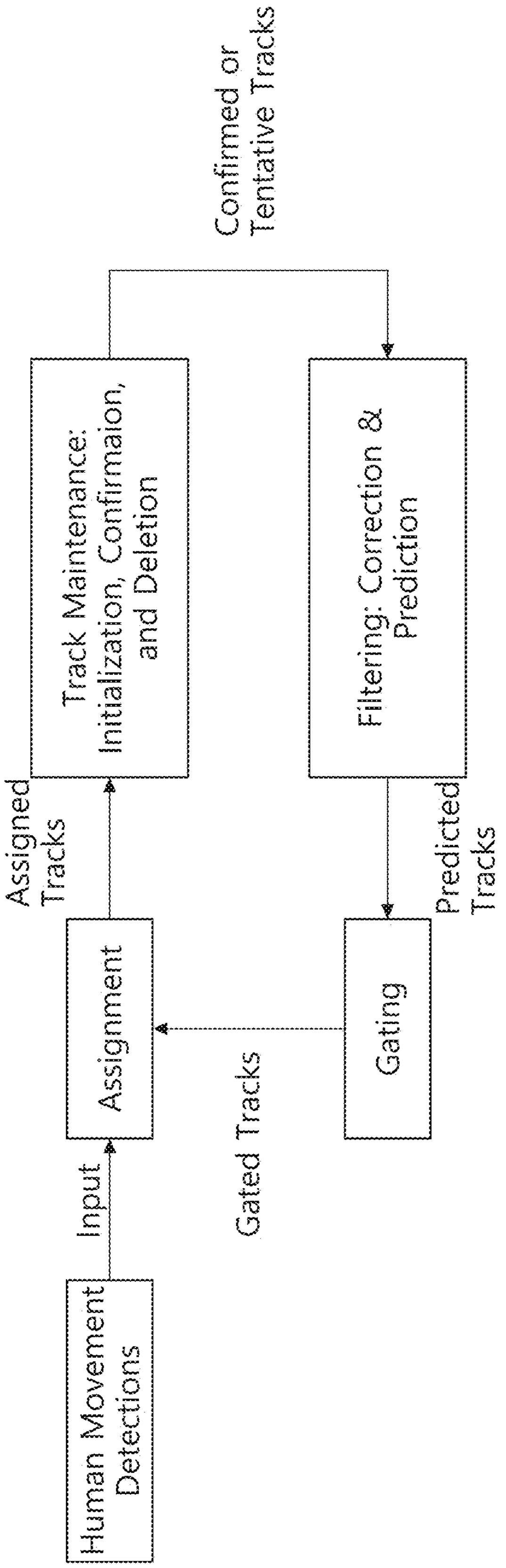
FIG. 10 illustrates an architecture of a multiple target tracking (MTT) system in accordance with an embodiment.

FIG. 10 illustrates an architecture of an MTT system in accordance with an embodiment. In particular, FIG. 10 illustrates a Human Movement Detections module, an Assignment Module, a Track Maintenance: Initialization, Confirmation and Deletion module, a Gating module, and a Filtering: Correction and Prediction module. As illustrated, Human Movement Detections module may provide an input to the Assignment module. The Assignment module may provide assigned tracks to the Track Maintenance module. The Track Maintenance module may provide confirmed or tentative tracks to the Filtering module. The Filtering module may provide predicted tracks to the Gating module. The Gating module may provide gated tracks to the Assignment module. In some embodiments, at each time step, it may be assumed that the system has maintained confirmed or tentative tracks from the previous CIR windows. Now the system may consider whether to update tracks based on any new human movement detections received from the radar. The common steps may include the following.

In some embodiments, the Filtering module includes an internal filter (e.g., a Kalman filter, among others) that predicts the confirmed or tentative tracks from the previous time step to the current time step. The motion model can be a random walk model with a defined maximum walking velocity.

The system may use the predicted estimate and covariance to form a validation gate, illustrated as Gating module, around the predicted track. The new human movement detections falling within the gate of a track may be considered as candidates for assignment to the track. An assignment algorithm performed by the Assignment module may determine the track-to-detection association. Based on the assignment, the Track Maintenance module may execute track maintenance, including initialization, confirmation and deletion. Unassigned human movement detections can initiate new tentative tracks. A tentative track may become confirmed if the quality of the track satisfies the confirmation criteria. Low-quality tracks may be deleted based on the deletion criteria. The new track set (tentative and confirmed) may be predicted to the next time step to form validation gates. As the result of this multi-target tracking stage, each human subject may be represented by a single track and the position with respect to the radar is known.

Radar Mode Scheduler

In some embodiments, when there is a need to satisfy multiple radar sensing tasks with different radar modes (e.g., as in Radar Configuration 2 and 3 described above), a radar mode scheduler may be utilized to allocate running time for each radar mode.

Since the positions of all human subjects within the field of view of the radar may be important to support multi-user gesture recognition with low miss rate and low false alarm rate, a Radar Mode A, which may be used for multi-subject tracking function, may be prioritized to run almost all the time to reflect the position of all the users correctly. In some embodiments, the tracking can work in a duty-cycle fashion: every T seconds, the radar collects CIR windows (from RX1 and RX2) of size W seconds to be used in the multi-subject tracking framework described herein. In some embodiments, T can be chosen in the order of 1-3 seconds in order to update the new positions of human subjects regularly enough, while W can be chosen in the order of <1 second to capture enough CIR samples for range and angle estimation and human movement classification. In order to support running different radar modes (such as Radar Mode B when gesture recognition for far distance is required), W is set to be smaller than T.

In some embodiments, the difference between Radar configuration 2 and Radar configuration 3 may be the number of radar modes needed to serve Gesture Recognition. Described below are scheduling strategies for each configuration in accordance with several embodiments.

In some embodiments, in each duty cycle, the Radar Mode scheduler may also be run to determine additional radar modes that may be needed. In some embodiments, the scheduler may first check if the device associated with the radar is currently in a mode that allows gesture input from the user. For example, when a TV is playing a movie, it is possible for the user to tap in the air to pause/replay the movie; or when a smart speaker is playing music, it is possible for the user to swipe left/right to move to previous/next song. If the device is in such gesture allowing mode, the scheduler iterates over the tracks from the multi-target human position tracking module one by one. Since gestures are often performed when a user is staying at a place, if a track is determined to stay still for a period of time, it is considered for a radar mode assignment. For this assignment, based on the position of the track, the proper radar mode is chosen:

For Radar Configuration 2, choose Radar Mode 2B for gestures at all distances.

For Radar Configuration 3, choose Radar Mode 3B for gestures at close distance and Radar Mode 3C for gestures at far distance.

Figure 11:
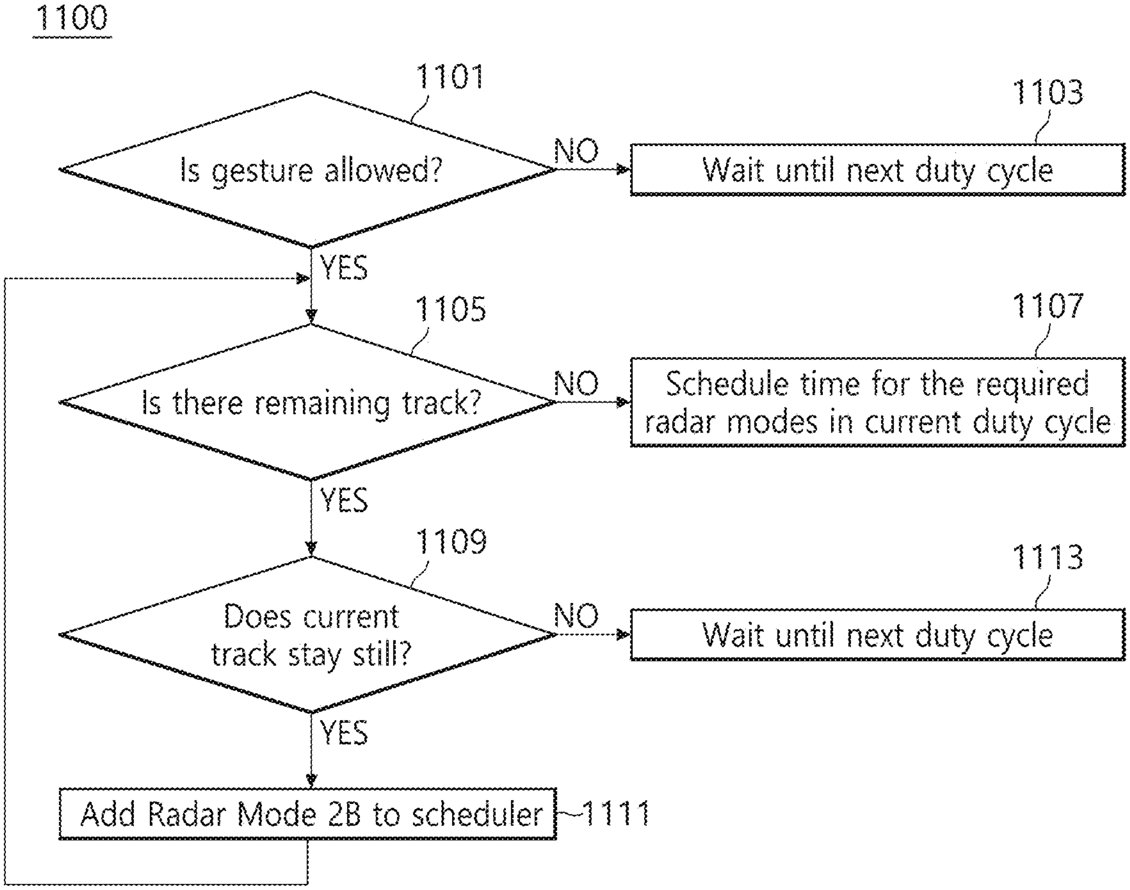
FIG. 11 illustrates a process used in a radar mode scheduler in accordance with an embodiment.

FIG. 11 illustrates a process used in a radar mode scheduler in accordance with an embodiment. In particular, the process determines at operation 1101 whether a gesture is allowed. If the process determines that the gesture is not allowed, the process proceeds to operation 1103 to wait until the next duty cycle. If the process determines that the gesture is allowed, the process proceeds to operation 1105 where the process determines whether there is a remaining track. If the process determines that there is no remaining track, the process proceeds to operation 1107 where the process schedules time for the required radar modes in current duty cycle. If the process determines in operation 1105 that yes there is a remaining track, the process proceeds to operation 1109 where the process determines whether the current track stays still. If the process determines that the current track does stay still, the process proceeds to operation 1111 where the process adds Radar Mode 2B to the schedule and returns to operation 1105. If the process determines that that current track does not stay still, the process proceeds to operation 1113 where the process waits until the next duty cycle.

In some embodiment, after iterating over all the tracks, the radar mode scheduler summarizes which radar mode is to be run in this duty cycle. Note that if multiple subjects are within the same range of a radar mode, only one session for this radar mode is needed to run. The scheduler may then use the remaining time of the current duty cycle to schedule the running time for the radar modes.

Figure 12:
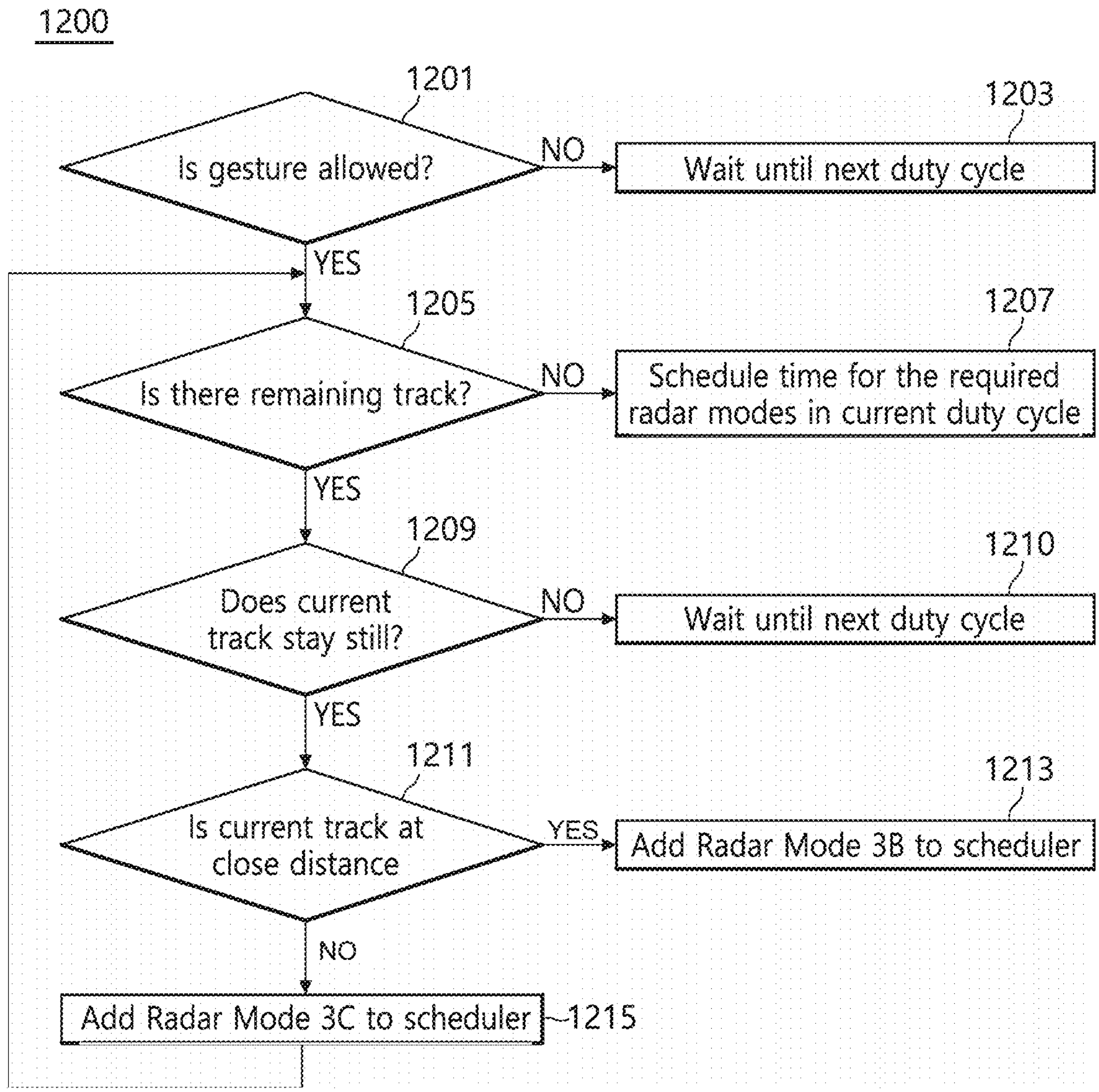
FIG. 12 illustrates an example of scheduling different radar modes for each duty cycle in accordance with an embodiment.

FIG. 12 illustrates an example of scheduling different radar modes for each duty cycle, in particular for Radar Configuration 3, in accordance with an embodiment. In particular, the process determines at operation 1201 whether a gesture is allowed. If the process determines that the gesture is not allowed, the process proceeds to operation 1203 to wait until the next duty cycle. If the process determines that the gesture is allowed, the process proceeds to operation 1205 where the process determines whether there is a remaining track. If the process determines that there is no remaining track, the process proceeds to operation 1207 where the process schedules time for the required radar modes in current duty cycle. If the process determines in operation 1205 that yes there is a remaining track, the process proceeds to operation 1209 where the process determines whether the current track stays still. If in operation 1209, the process determines that the current track does stay still, the process proceeds to operation 1211 where the process determines whether the current track is at a close distance. If in operation 1209, the process determines that the current track does not stay still, the process proceeds to operation 1210 where the process waits until the next duty cycle. If the process determines in operation 1211 that yes the current track is at a close distance, the process proceeds to operation 1213 where the process adds Radar Mode 3B to the schedule. If in operation 1211 the process determines that the current track is not at a close distance, the process proceeds to operation 1215 where the process adds Radar Mode 3C to the schedule and returns to operation 1205.

Figure 13:
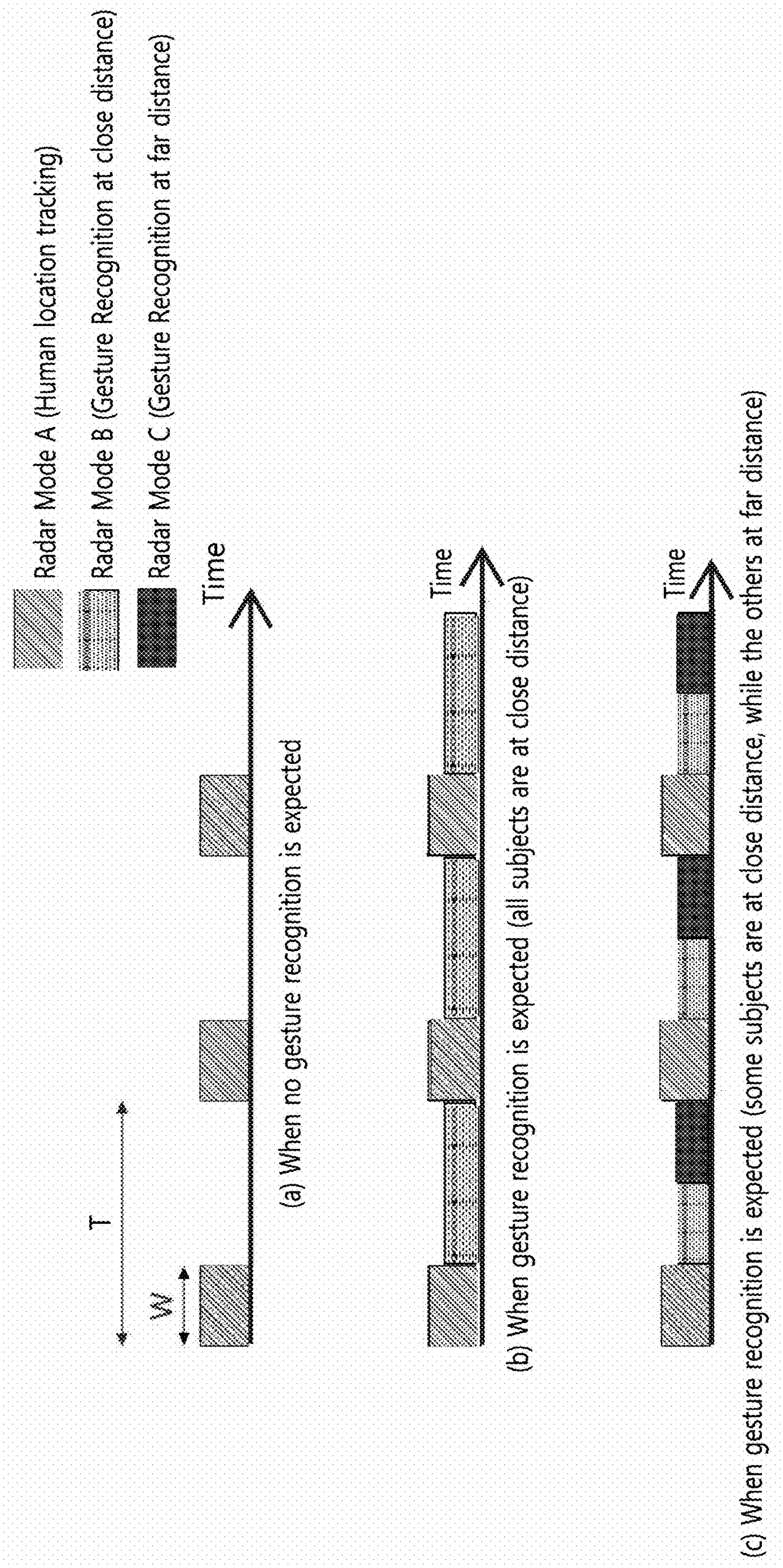
FIG. 13 illustrates scheduling different radar modes for each duty cycle in accordance with an embodiment.

FIG. 13 illustrates scheduling different radar modes for each duty cycle in accordance with an embodiment. In particular, item (a) illustrates when no gesture recognition is expected, item (b) illustrates when gesture recognition is expected and all subjects are at a close distance, and (c) illustrates when gesture recognition is expected and some subjects are at close distances, while the others are at far distances.

Although the most common time scheduling mechanism is to divide time equally for each radar mode session, other advanced time scheduling mechanisms are possible. In some embodiments, when certain context information indicates that the users are not moving again soon, such as the track positions stay relatively constant after a while, or the tracks are at a known sofa position, Radar Mode A can be run less frequently (e.g. ran once every N duty cycle), which may effectively increase the session for the gesture recognition radar modes.

In some embodiments, when the gesture recognition radar session requires a longer time than the remaining time of a duty cycle, the following strategy can be utilized. The gesture recognition radar session would be allowed to run until the end the session, with the human tracking radar session being skipped. The radar parameters used in gesture recognition may be sufficient to cover the motion tracking purpose, with minor downside of higher energy consumption due to higher PRF. Thus the same CIR data collected in gesture recognition data session could be used to estimate human movement position in the next duty cycles as well. When the gestures are not expected anymore, the scheduler may go back to the original scheduling.

In some embodiments, to further reduce energy consumption, instead of allocating time for gesture recognition in all duty cycles when the gestures are expected (e.g., application awaiting gestures+the track staying still), a wakeup mechanism can be introduced as follows: during a Radar Mode A session, the system may also perform a simple wakeup gesture detection, such as detecting if a hand is raising. Such coarse-grained gestures can still be detected by low PRF in Radar Mode A. In some embodiments, radar modes for gesture recognition are scheduled only upon detection of a wake up gesture. This scheduling strategy may allow reducing the number of unnecessary separate radar sessions for gesture recognition.

Distance Filtering and Angle Range Adjustment for Gesture Recognition

Figure 14:
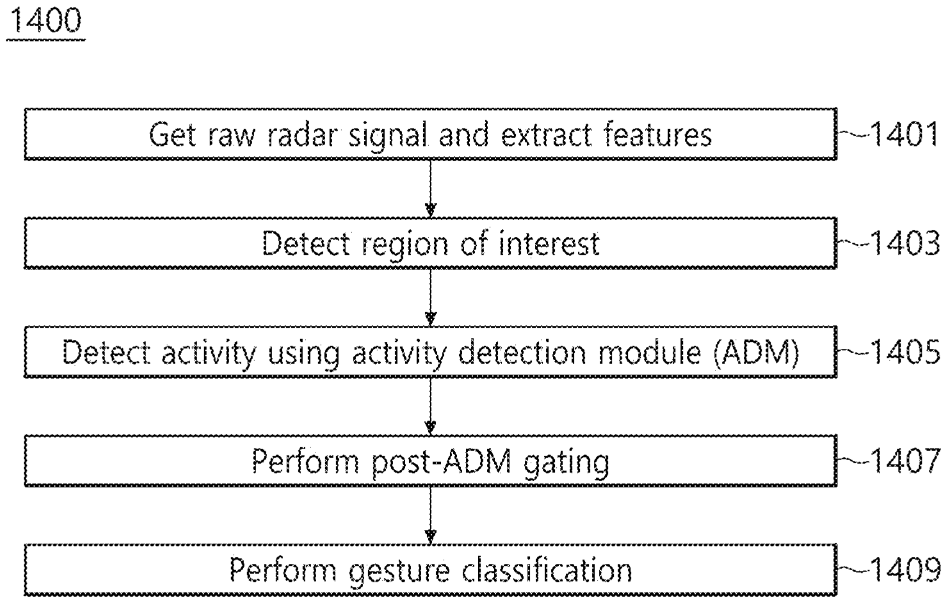
FIG. 14 illustrates a gesture recognition processing pipeline in accordance with an embodiment.

FIG. 14 illustrates a gesture recognition processing pipeline in accordance with an embodiment. The processing pipeline may include a get raw radar signal and extract features module, a detect region of interest module, an activity detection module (ADM), a post-ADM gating module, and a gesture classification module.

The get raw radar signal and extract features module may obtain the raw radar signal and extract features. The raw radar signal may be first pre-processed to extract relevant features. The processing can include removing clutters caused by unwanted reflections from surrounding environment. Features related to the desired target (hand) could include the target's range, Doppler, and angle.

The detect region of interest module may detect a region of interest.

The activity detection module (ADM) may be used to try to detect an end of an activity. This module may utilize some hand-crafted signal processing features, such as signal strength, Doppler (i.e. speed) of the target, range of the target, among other features. The ADM's main functionality may be to detect any gesture end, with the possibility of sometimes unrelated motions, which may be referred to as a non-gesture (NG).

The Post-ADM module may be an additional module after the ADM that may remove NG samples based on either signal processing approaches or machine learning based solutions. For example, some embodiments may extract some statistics from the collected samples, such as range, Doppler spread, angle, duration of the activity, among others, then check if these statistics belong to their expected distributions to determine whether current sample is a gesture or a NG.

Finally, if an activity sample passes the checks by the post-ADM gating module, it is provided to a gesture classification module to classify its type and return an output back to the system. The gesture classifier module may include a classical machine learning approach like SVM, random forest, among others or a neural network like CNN or LSTM. Common radar input features to the classifier may be several time diagrams, as described below.

Figure 15:
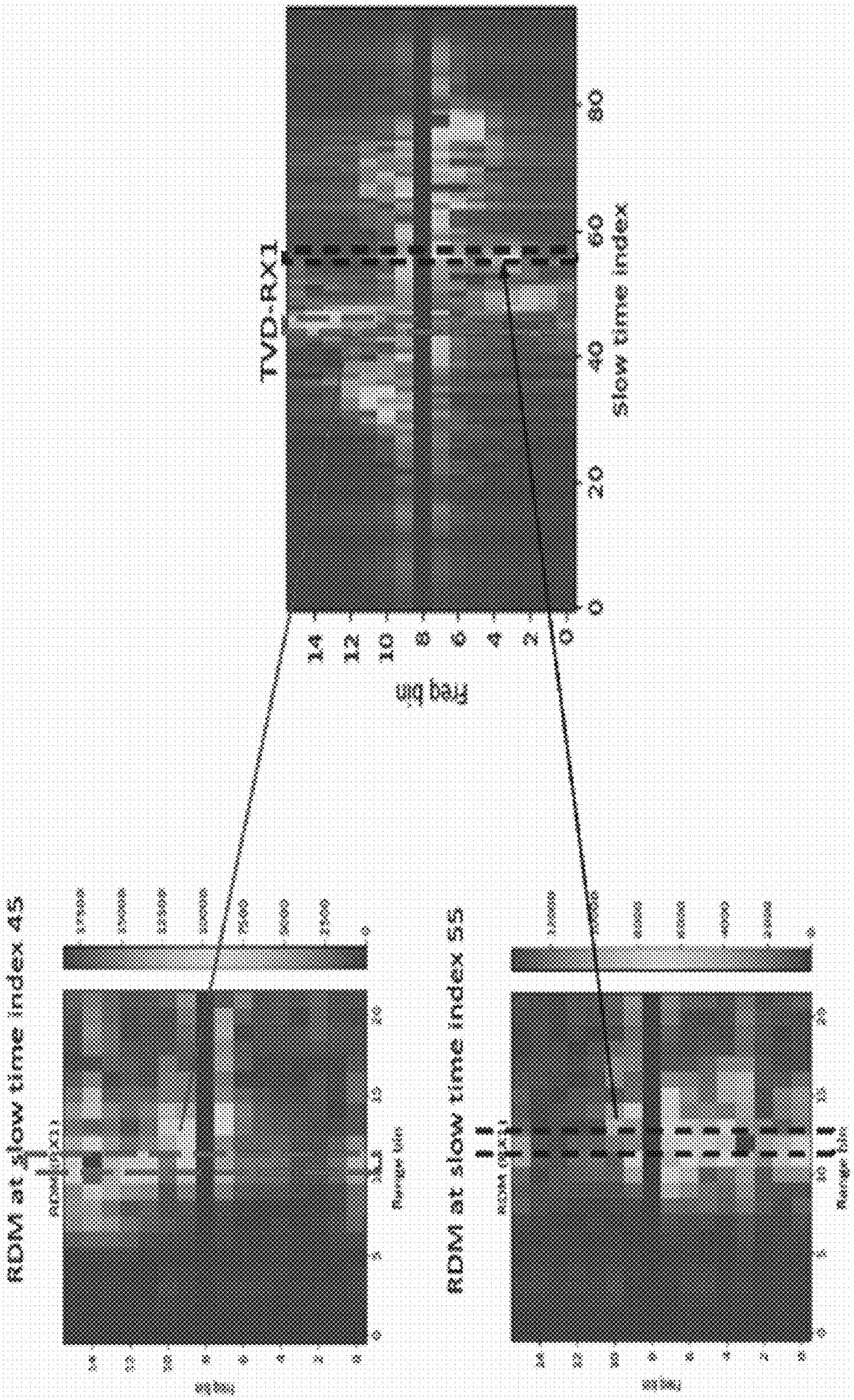
FIG. 15 illustrates a Time-Velocity Diagram (TVD) in accordance with an embodiment.

FIG. 15 illustrates a Time-Velocity Diagram (TVD) in accordance with an embodiment. In some embodiments, the TVD is computed from consecutive RDMs and shows the Doppler change vs time. Each column of the TVD corresponds to one slow time index, and it is the column at the target range bin from the corresponding Range Doppler Map.

Figure 16:
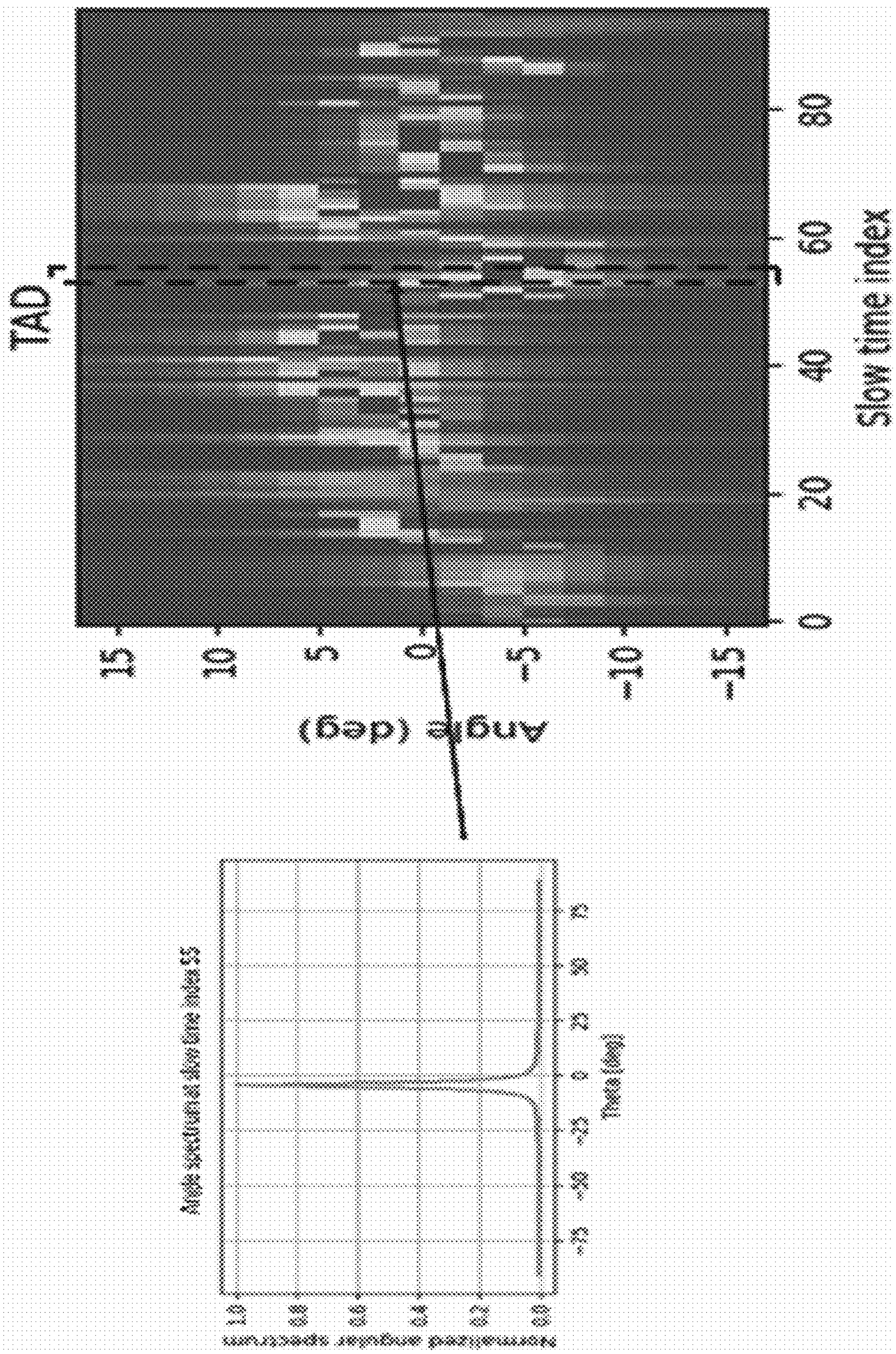
FIG. 16 illustrates a Time-Angle Diagram (TAD) in accordance with an embodiment.

FIG. 16 illustrates a Time-Angle Diagram (TAD) in accordance with an embodiment. In some embodiments, the TAD represents the angular spectrum vs time. At each slow time index, after the range bin corresponding to the target is chosen, the corresponding CIR windows from two receivers are used to compute the angular spectrum, which is used as the column data in the TAD corresponding to that slow time index.

Using Human Tracking Location Results to Improve Gesture Recognition Performance In some embodiments, in the processing pipeline illustrated in FIG. 14, the detecting region of interest module may be implemented by choosing the consecutive range bins surrounding the range bin with maximum reflection energy or by choosing a predefined working range from the device (e.g. a smart speaker can assume that the gesture should be performed within its 50-100 cm radius). However, in certain target applications where multiple users can perform hand gestures at different positions in front of the device, this approach may not work well for the below reasons.

A random motion from a user (user A) that is closer to the device may create higher reflection energy than another user (user B) that is performing a hand gesture. Range bin selection purely based on highest received energy would discard the hand gestures from user B.

When the working distance becomes longer (e.g. 4 m), the region of interest would become larger, thus introducing more potential false alarms from other unrelated motions in the same region.

In some embodiments, based on the human tracking location results obtained from a previous stage, the region of interest may be chosen more properly. The last known position of each human subject may be saved for this distance and angle range adjustment for gesture recognition. Suppose a subject has a detected position of range r and angle θ with respect to the radar coordinate system. Since it is natural for the user to perform a gesture towards the device as a way to express the intention, it is reasonable to assume that the hand movements would appear within a few range bins closer to the radar than the human body centroid. For example, when the UWB Radar's range bin resolution is 15 cm, only 6-7 range bins in front of the human body centroid may be checked for potential gestures, effectively covering a range of 1 m in front of the user.

In some embodiments, the angle range may be adjusted to further reduce the potential for fall alarms. Given the angle of the human body centroid with respect to the radar is θ, it may be extended by some margin to obtain the angle range [θ−dθ, θ+dθ]. dθ can be roughly estimated by the maximum tangential swing distance of the hand in the gesture and the current distance between the subject and the radar.

Figure 17:
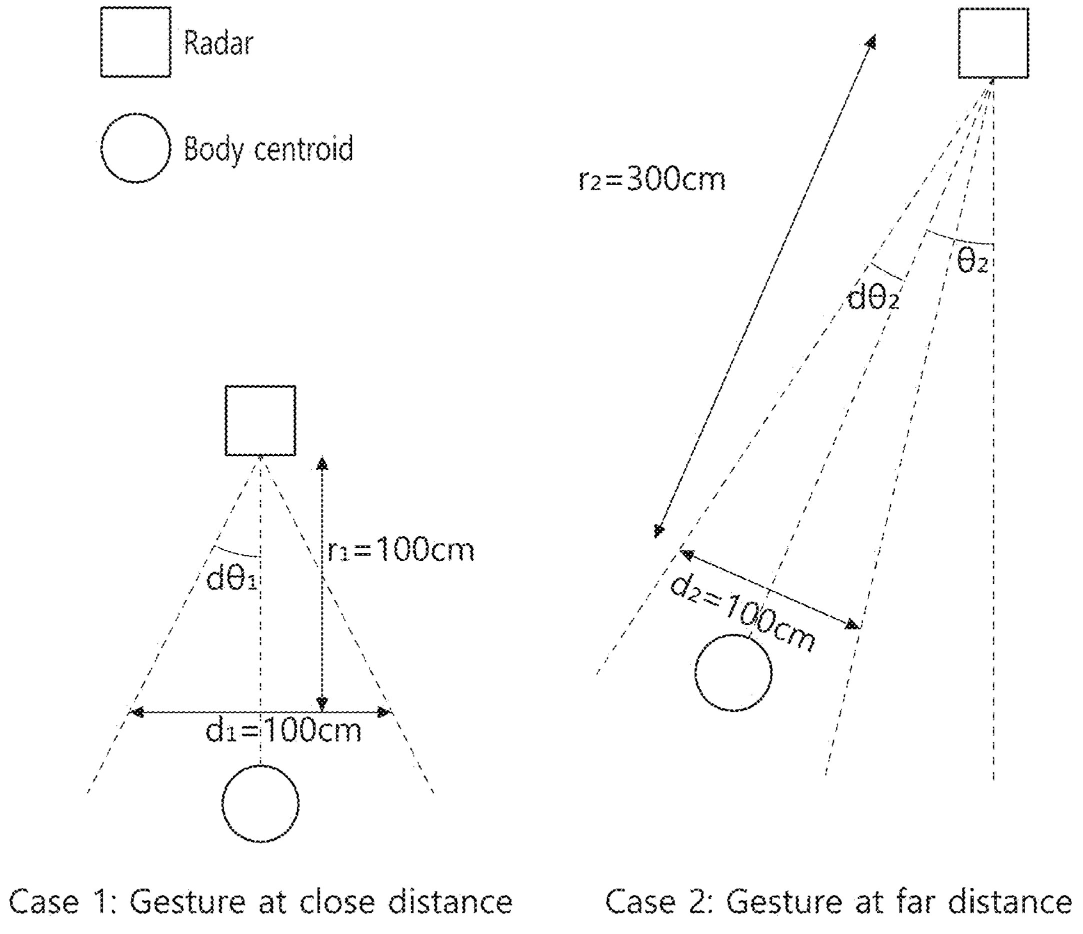
FIG. 17 provides an illustration of the calculation of an angle range in accordance with an embodiment.

FIG. 17 provides an illustration of the calculation of an angle range in accordance with an embodiment. In case 1, when the gesture is performed at close distance ($r_1$=100 cm) and boresight ($\theta_1$=0 deg), if the maximum tangential swing distance of the hand in the gesture is $d_1$=100 cm, the angle range is calculated by $$d\theta_1 = \mathrm{atan}\frac{d_1}{2r_1} \approx 26.6deg.$$

In case 2, when the gesture is performed at far distance ($r_2$=300 cm) and on the left side of the radar ($\theta_2$=30 deg), if the maximum tangential swing distance of the hand in the gesture remains $d_2$=100 cm, the angle range is calculated by $$d\theta_2 = \mathrm{atan}\frac{d_2}{2r_2} \approx 9.46deg$$

These angles can help make the TAD pattern become observable to the classifier. To be used as input to the gesture classifier, the TAD should have a fixed shape of (number of angle points×number of samples). While the number of samples within a window is fixed, the number of angle points are generally adjustable by two parameters: angle range and angle resolution. For example, an angle range from −80 deg to 80 deg with a resolution of 10 deg will produce 17 angle points (−80, −70, −60, . . . , −10, 0, 10, . . . , 80). An angle range from −10 deg to 10 deg with a resolution of 2 deg will produce 11 angle points (−10, −8, . . . , −2, 0, 2, . . . , 10). Depending on the position of the user, the angle range and resolution should be chosen accordingly, so that the angle change signatures remain distinctive to the classifier.

Figure 18:
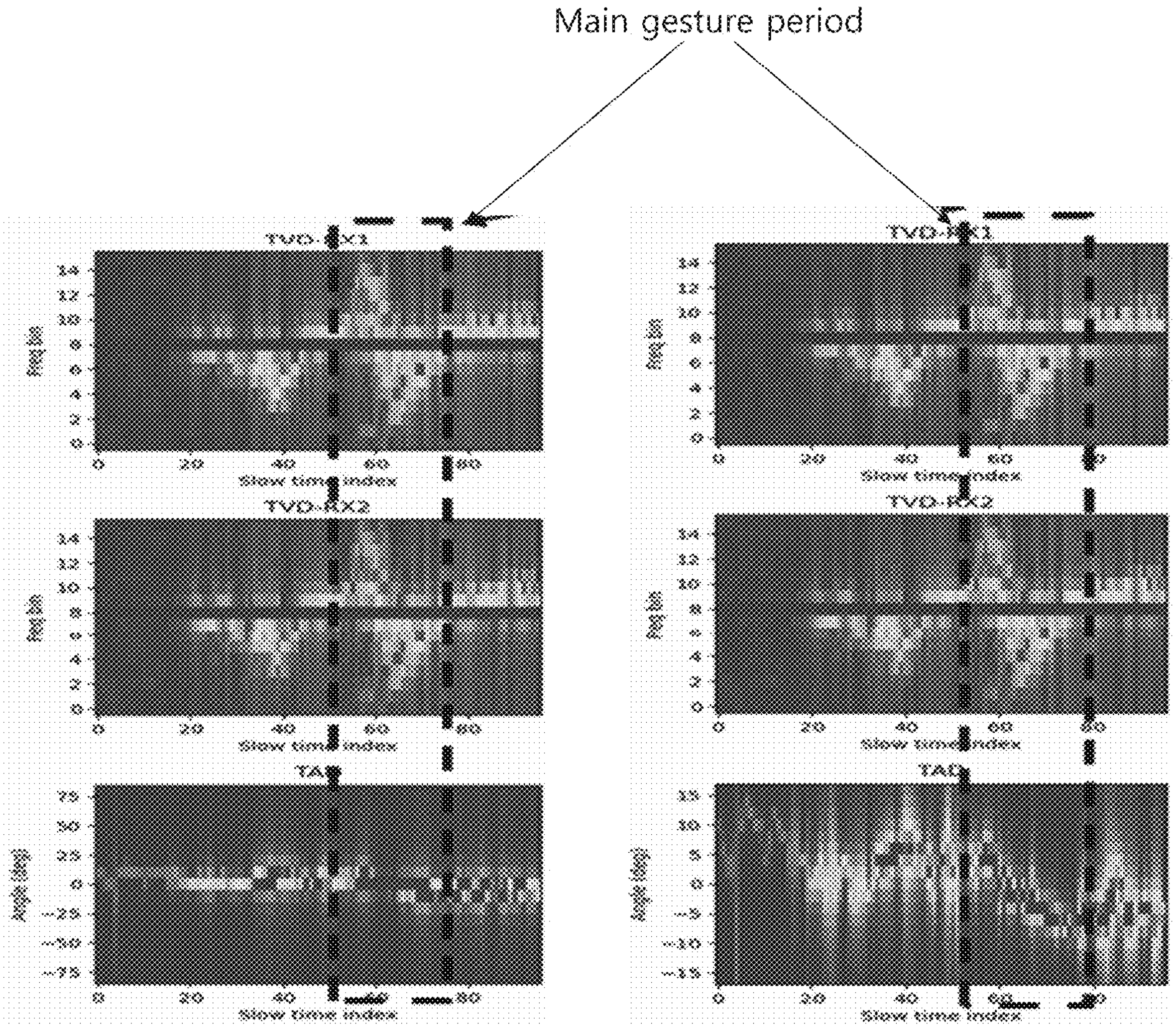
FIG. 18 illustrates the effect of angle range and resolution settings on TAD features in accordance with an embodiment.

FIG. 18 illustrates the effect of angle range and resolution settings on TAD features in accordance with an embodiment. In particular, FIG. 18 illustrates the effect of setting a proper set of angle range and resolution in TAD calculation. In an experiment, a human subject sits at boresight (θ=0 deg) and at a distance 3 m from the radar and performs a swipe gesture from right to left. Due to the long distance, the angle range is smaller: dθ=9 deg. The TVDs for RX1 and RX2 are shown to indicate the main gesture period within the 2 second window (they are the same in both cases (a) and (b)). In case (a), the TAD was calculated with angle range from −80 deg to 80 deg with angle resolution of 10 deg. In case (b), the TAD was calculated with angle range from −16 deg to 16 deg with angle resolution of 2 deg. In both cases the resultant TADs have the size 17 angle points×96 slow time index. However, only in case (b), thanks to the finer angle resolution and smaller angle range, a clear pattern is observed of hand movements within the main gesture period. The angle bin having the maximum angular spectrum energy moves from roughly +6 deg to −9 deg. In case (a), within the main gesture period, the maximum angular spectrum energy falls into a single angle bin. Experiments show that TADs calculated from case (b) provide higher accuracy when feeding into a ML classifier.

In some embodiments, a multi-step processing may help reduce false alarm rates significantly. In some embodiments, the multi-target human location tracking may be a first filter: random movements (e.g. pets, fans, cleaning robots, among others) from location with no known human movements will not be considered. Next, only the several range bins in front of the human subject may be considered, which may further reduce unnecessary range bin selections. Lastly, the angle refinement may help produce valid TAD features, which in turn may help the gesture classifier produce better decision. In some embodiments, the classifier may also classify gestures vs non-gestures, and sometimes TAD calculated from random motions can trigger the classifier to raise gesture detection.

In some embodiments, as the distance between the radar and a human subject becomes longer, the angle change in TAD becomes smaller and harder to observe. The TVD represents the velocity change in the radial direction and may be more tolerant of the increased distance. In some embodiments, instead of using a common set of gestures for both close and far distance, the system can rely on the detected human positions to provide appropriate set of gestures. For example, when user A is staying near the radar, the user can do a larger set of gestures, such as push pull, swipe left, swipe right, and the system utilizes both TAD and TVD features for classification. In contrast, when user A is moving too far from the radar, the user may do a more limited set of gestures, such as single tap, double tap (gestures performed toward the radar), and the system utilizes only TVD features for classification.

A reference to an element in the singular is not intended to mean one and only one unless specifically so stated, but rather one or more. For example, “a” module may refer to one or more modules. An element proceeded by “a,” “an,” “the,” or “said” does not, without further constraints, preclude the existence of additional same elements.

Headings and subheadings, if any, are used for convenience only and do not limit the invention. The word exemplary is used to mean serving as an example or illustration. To the extent that the term “include,” “have,” or the like is used, such term is intended to be inclusive in a manner similar to the term “comprise” as “comprise” is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase “at least one of” preceding a series of items, with the terms “and” or “or” to separate any of the items, modifies the list as a whole, rather than each member of the list. The phrase “at least one of” does not require selection of at least one item; rather, the phrase allows a meaning that includes at least one of any one of the items, and/or at least one of any combination of the items, and/or at least one of each of the items. By way of example, each of the phrases “at least one of A, B, and C” or “at least one of A, B, or C” refers to only A, only B, or only C; any combination of A, B, and C; and/or at least one of each of A, B, and C.

As described herein, any electronic device and/or portion thereof according to any example embodiment may include, be included in, and/or be implemented by one or more processors and/or a combination of processors. A processor is circuitry performing processing.

Processors can include processing circuitry, the processing circuitry may more particularly include, but is not limited to, a Central Processing Unit (CPU), an MPU, a System on Chip (SoC), an Integrated Circuit (IC) an Arithmetic Logic Unit (ALU), a Graphics Processing Unit (GPU), an Application Processor (AP), a Digital Signal Processor (DSP), a microcomputer, a Field Programmable Gate Array (FPGA) and programmable logic unit, a microprocessor, an Application Specific Integrated Circuit (ASIC), a neural Network Processing Unit (NPU), an Electronic Control Unit (ECU), an Image Signal Processor (ISP), and the like. In some example embodiments, the processing circuitry may include: a non-transitory computer readable storage device (e.g., memory) storing a program of instructions, such as a DRAM device; and a processor (e.g., a CPU) configured to execute a program of instructions to implement functions and/or methods performed by all or some of any apparatus, system, module, unit, controller, circuit, architecture, and/or portions thereof according to any example embodiment and/or any portion of any example embodiment. Instructions can be stored in a memory and/or divided among multiple memories.

Different processors can perform different functions and/or portions of functions. For example, a processor 1 can perform functions A and B and a processor 2 can perform a function C, or a processor 1 can perform part of a function A while a processor 2 can perform a remainder of function A, and perform functions B and C. Different processors can be dynamically configured to perform different processes. For example, at a first time, a processor 1 can perform a function A and at a second time, a processor 2 can perform the function A. Processors can be located on different processing circuitry (e.g., client-side processors and server-side processors, device-side processors and cloud-computing processors, among others).

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method of multi-user gesture recognition, comprising:

determining positions of a plurality of users based on a first radar information from at least one radar;

determining a plurality of regions of interest for the plurality of users based on positions of the plurality of users;

in a first duty cycle of a plurality of duty cycles, obtaining a second radar information using a first radar configuration that includes a first set of parameters for gesture recognition at a range of distances based on the plurality of regions of interest;

in a second duty cycle of the plurality of duty cycles, obtaining a third radar information using a second radar configuration that includes a first radar mode for a first time period and a second radar mode for a second time period based on the plurality of regions of interest, wherein the first radar mode includes the first set of parameters for gesture recognition at the range of distances and the second radar mode includes a second set of parameters for gesture recognition within a closer range of distances; and detecting a first user gesture from a first user of the plurality of users and a second user gesture from a second user of the plurality of users based on the second radar information and the third radar information.

2. The method of claim 1, further comprising refining, for each of the plurality of users, a region of interest from the plurality of regions of interest to a user's hand position based on distance and angle range adjustments from the second radar information and the third radar information.

3. The method of claim 2, further comprising analyzing a few range bins closer to the radar than a user body centroid to determine hand movements.

4. The method of claim 2, further comprising adjusting an angle range by a margin estimated by a maximum a tangential distance of moving the user's hand and a current distance between the user and the radar.

5. The method of claim 1, further comprising in a third duty cycle of the plurality of duty cycles, determining that a gesture is not allowed and waiting until a next duty cycle.

6. The method of claim 1, further comprising using a third radar configuration for a third time period, wherein the third radar configuration includes a third set of parameters for gesture recognition at a far distance.

7. The method of claim 1, further comprising saving a last known position of a user.

8. The method of claim 1, wherein the first time period is less than the second time period.

9. The method of claim 1, wherein the second radar configuration is continued beyond the end of the duty cycle.

10. The method of claim 1, wherein the first set of parameters specifies a first pulse repetition rate (PRF) and the second set of parameters specifies a second PRF, wherein the first PRF is lower than the second PRF.

11. A device in a wireless network, the device comprising:

a memory;

a processor coupled to the memory, the processor configured to:

determine positions of a plurality of users based on a first radar information from at least one radar;

determine a plurality of regions of interest for the plurality of users based on positions of the plurality of users;

in a first duty cycle of a plurality of duty cycles, obtain a second radar information using a first radar configuration that includes a first set of parameters for gesture recognition at a range of distances based on the plurality of regions of interest;

in a second duty cycle of the plurality of duty cycles, obtain a third radar information using a second radar configuration that includes a first radar mode for a first time period and a second radar mode for a second time period based on the plurality of regions of interest, wherein the first radar mode includes the first set of parameters for gesture recognition at the range of distances and the second radar mode includes a second set of parameters for gesture recognition within a closer range of distances; and detect a first user gesture from a first user of the plurality of users and a second user gesture from a second user of the plurality of users based on the second radar information and the third radar information.

12. The device of claim 11, wherein the processor is further configured to refine, for each of the plurality of users, a region of interest from the plurality of regions of interest to a user's hand position based on distance and angle range adjustments from the second radar information and the third radar information.

13. The device of claim 12, wherein the processor is further configured to analyze a few range bins closer to the radar than a user body centroid to determine hand movements.

14. The device of claim 12, wherein the processor is further configured to adjust an angle range by a margin estimated by a maximum of a tangential distance of moving the user's hand and a current distance between the user and the radar.

15. The device of claim 11, wherein the processor is further configured to, in a third duty cycle of the plurality of duty cycles, determine that a gesture is not allowed and waiting until a next duty cycle.

16. The device of claim 11, wherein the processor is further configured to use a third radar configuration for a third time period, wherein the third radar configuration includes a third set of parameters for gesture recognition at a far distance.

17. The device of claim 11, wherein the processor is further configured to save a last known position of a user.

18. The device of claim 11, wherein the first time period is less than the second time period.

19. The device of claim 11, wherein the second radar configuration is continued beyond the end of the duty cycle.

20. The device of claim 11, wherein the first set of parameters specifies a first pulse repetition rate (PRF) and the second set of parameters specifies a second PRF, wherein the first PRF is lower than the second PRF.

* * * * *